United States Patent
Melendez et al.

(10) Patent No.: US 9,542,145 B2
(45) Date of Patent: Jan. 10, 2017

(54) DYNAMIC USER INTERFACE FOR DEVICE MANAGEMENT SYSTEM

(71) Applicants: Greg Melendez, East Stroudsburg, PA (US); Tom Haapanen, Heidelberg (CA)

(72) Inventors: Greg Melendez, East Stroudsburg, PA (US); Tom Haapanen, Heidelberg (CA)

(73) Assignee: RICOH COMPANY, LTD., Tokyo (JP)

( * ) Notice: Subject to any disclaimer, the term of this patent is extended or adjusted under 35 U.S.C. 154(b) by 357 days.

(21) Appl. No.: 13/758,116

(22) Filed: Feb. 4, 2013

(65) Prior Publication Data

US 2014/0223325 A1 Aug. 7, 2014

(51) Int. Cl.
*G06F 3/0487* (2013.01)
*G06F 3/12* (2006.01)

(52) U.S. Cl.
CPC ........... *G06F 3/1288* (2013.01); *G06F 3/1207* (2013.01); *G06F 3/1229* (2013.01); *G06F 3/1273* (2013.01)

(58) Field of Classification Search
CPC .... H04L 41/22; H04L 29/0809; G06F 3/0481; G06F 3/047
USPC ........................................ 715/734, 744, 736
See application file for complete search history.

(56) References Cited

U.S. PATENT DOCUMENTS

| | | | |
|---|---|---|---|
| 6,668,253 B1* | 12/2003 | Thompson et al. | |
| 2004/0225955 A1 | 11/2004 | Ly | |
| 2006/0112175 A1 | 5/2006 | Sellers et al. | |
| 2008/0086345 A1 | 4/2008 | Wilson et al. | |
| 2008/0215727 A1* | 9/2008 | Denis et al. | 709/224 |
| 2009/0164250 A1* | 6/2009 | Hamilton et al. | 705/3 |
| 2009/0307678 A1* | 12/2009 | Wu | 717/168 |
| 2011/0148914 A1* | 6/2011 | Kim et al. | 345/619 |
| 2012/0065802 A1* | 3/2012 | Seeber et al. | 700/295 |
| 2012/0218578 A1 | 8/2012 | Tanaka | |
| 2012/0265865 A1 | 10/2012 | Tanaka et al. | |
| 2012/0266073 A1 | 10/2012 | Tanaka et al. | |
| 2013/0086022 A1* | 4/2013 | Black et al. | 707/705 |
| 2013/0176315 A1* | 7/2013 | Winkle et al. | 345/440 |
| 2014/0040257 A1* | 2/2014 | Chandrasekaran | 707/736 |
| 2014/0053091 A1* | 2/2014 | Hou et al. | G06F 17/30389 715/769 |
| 2014/0181085 A1* | 6/2014 | Gokhale et al. | 707/722 |

OTHER PUBLICATIONS

U.S. Appl. No. 13/758,082, Kenji Hagiwara Tom Haapanen Arturo Hung Tse, Device Management Apparatus, System and Method Including Remote Configuration of Device Preference Settings.
U.S. Appl. No. 13/758,089, Kenji Hagiwara Jim Vopni Shun Tanaka, Customizing Security Role in Device Management System, Apparatus and Method.

(Continued)

*Primary Examiner* — William Bashore
*Assistant Examiner* — Jeanette J Parker
(74) *Attorney, Agent, or Firm* — Cooper & Dunham LLP

(57) ABSTRACT

Tools are provided for managing information technology (IT) devices in an IT environment in which at least some of the devices are connected to a network, and device information is presented to a user in a dynamic, manageable and informative manner. The device information presented may be on a global or enterprise-wide scale, or drilled down to a more specific level, geographically or otherwise.

19 Claims, 29 Drawing Sheets

(56) References Cited

OTHER PUBLICATIONS

U.S. Appl. No. 13/758,097, Kenji Hagiwara Jim Vopni Shun Tanaka, System, Apparatus and Method for Managing Heterogeneous Group of Devices.
U.S. Appl. No. 13/758,103, Shun Tanaka Jim Vopni, Management of Device Management Units.
U.S. Appl. No. 13/758,110, Greg Anderson Tom Haapanen Kenji Hagiwara, Device Management System, Apparatus and Method Configured for Customizing a Power Filter.
U.S. Appl. No. 13/758,082, Kenji Hagiwara et al., filed Feb. 4, 2013.
U.S. Appl. No. 13/758,089, Kenji Hagiwara et al., filed Feb. 4, 2013.
U.S. Appl. No. 13/758,097, Kenji Hagiwara et al., filed Feb. 4, 2013.
U.S. Appl. No. 13/758,103, Shun Tanaka et al., filed Feb. 4, 2013.
U.S. Appl. No. 13/758,110, Greg Anderson et al., filed Feb. 4, 2013.

* cited by examiner

DEVICE DATA

| Name | Manufacturer | IP address | Device Age | Status | Firmware Version | Department |
|---|---|---|---|---|---|---|
| MFP 303A-1 | Company A | 172.16.121.255 | 2 years | Maximum storage capacity reached | 10.2.1 | IT |
| Printer 303A-2 | Company B | 172.16.121.23 | 3 years | Ready | 2.009 | Accounting |
| Scanner 303A-3 | Company A | 172.16.121.25 | 6 months | Sleep mode | 11.1.1 | Legal |

Fig. 5

DYNAMIC USER INTERFACE FOR DEVICE MANAGEMENT SYSTEM

TECHNICAL FIELD

This disclosure relates to tools (such as systems, apparatuses, methodologies, computer program products, etc.) for managing information technology devices.

BACKGROUND

In the current information age, information technology (IT) tools are extensively used in enterprises and other organizations in order to facilitate processing of documents and data. IT administrators typically have the responsibilities of monitoring and managing IT devices, such as computers, printers, scanners, multi-function devices (MFDs) and other network-connected or standalone devices.

For example, in an enterprise environment, such as in a multi-national corporation, or another organization, including offices over wide geographical expanse, an administrator may need or desire to detect global or local trends in device usage or operation patterns in the IT environment administered by the administrator, as well as immediate developments that may be evident from the appropriate view or views of device data.

Device management tools (such as application software, etc.) are available to IT administrators to assist the administrators to track, monitor and otherwise manage the devices. For example, such tools commonly include a list view of the devices in the IT environment, displaying device information (e.g., device name, status, location, make, etc.) in a list format. An example of such list is illustrated in FIG. 1.

There is a drawback, however, in that the number of IT devices connected to a network is generally increasing and, as a result, an IT administrator is required to oversee a growing number of IT assets. Thus, it is sometimes difficult to grasp the overall status of the network environment and locate or anticipate the problems in the network environment from such list view.

There exists a need for an improved method of monitoring the condition of a network environment including a large number of information technology devices.

SUMMARY

In an aspect of this disclosure, there are provided tools (for example, a system, an apparatus, application software, etc.) to help an information technology (IT) administrator with management of IT assets in a networked IT system, in which a device management unit collects device data from network devices, and the collected device data is assembled and displayed in a manner useful to the IT administrator. Such display can include appropriate view or views of device data which are updated dynamically to reflect the ever-changing data and can be dynamically changed and customized to enable the administrator to view the environment as a whole in an optimal or otherwise desired manner, as well as to drill down to specific aspects within the environment. In another aspect, the device management unit allows a user to customize how the device data is displayed to the user in a graphical user interface (GUI). The device management unit may allow the user to move around different elements in the GUI and add or remove such elements to and from a widget display part of the GUI. The device management unit may also allow the user to select from various parameters to specify what kind of device data the user wants displayed in the GUI.

In another aspect, the device management unit provides the user with default configurations from which the user can create custom configurations indicating which device data is to be displayed where in the GUI in what manner.

BRIEF DESCRIPTION OF THE DRAWINGS

The aforementioned and other aspects, features and advantages can be more readily understood from the following detailed description with reference to the accompanying drawings wherein:

FIG. 5 shows a sample device data stored in a device data store, such as illustrated in FIG. 2, according to an exemplary embodiment;

DETAILED DESCRIPTION

Figure 1:
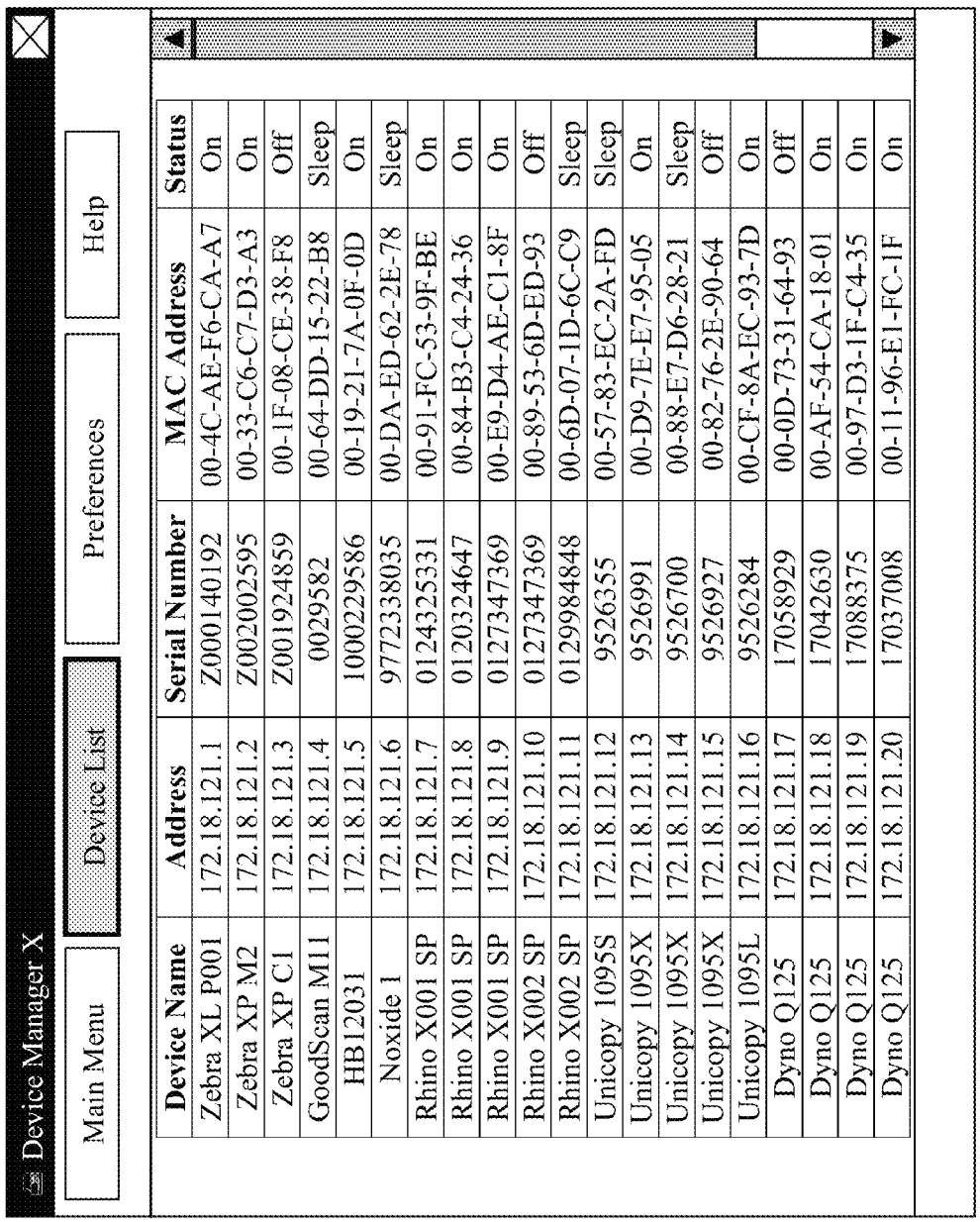
FIG. 1 shows a screenshot of a list view provided by a conventional data management system.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, there is described tools (systems, apparatuses, methodologies, computer program products, etc.) for managing information technology devices, such as computers, printers, scanners, multi-function devices, and other network-connected, or standalone, devices (such as a projector unit, a video conference device, a telephone conference device, a shredding device, a stamp device, etc.), and for managing one or more networks to which a plurality of such information technology devices are connected.

Figure 2:
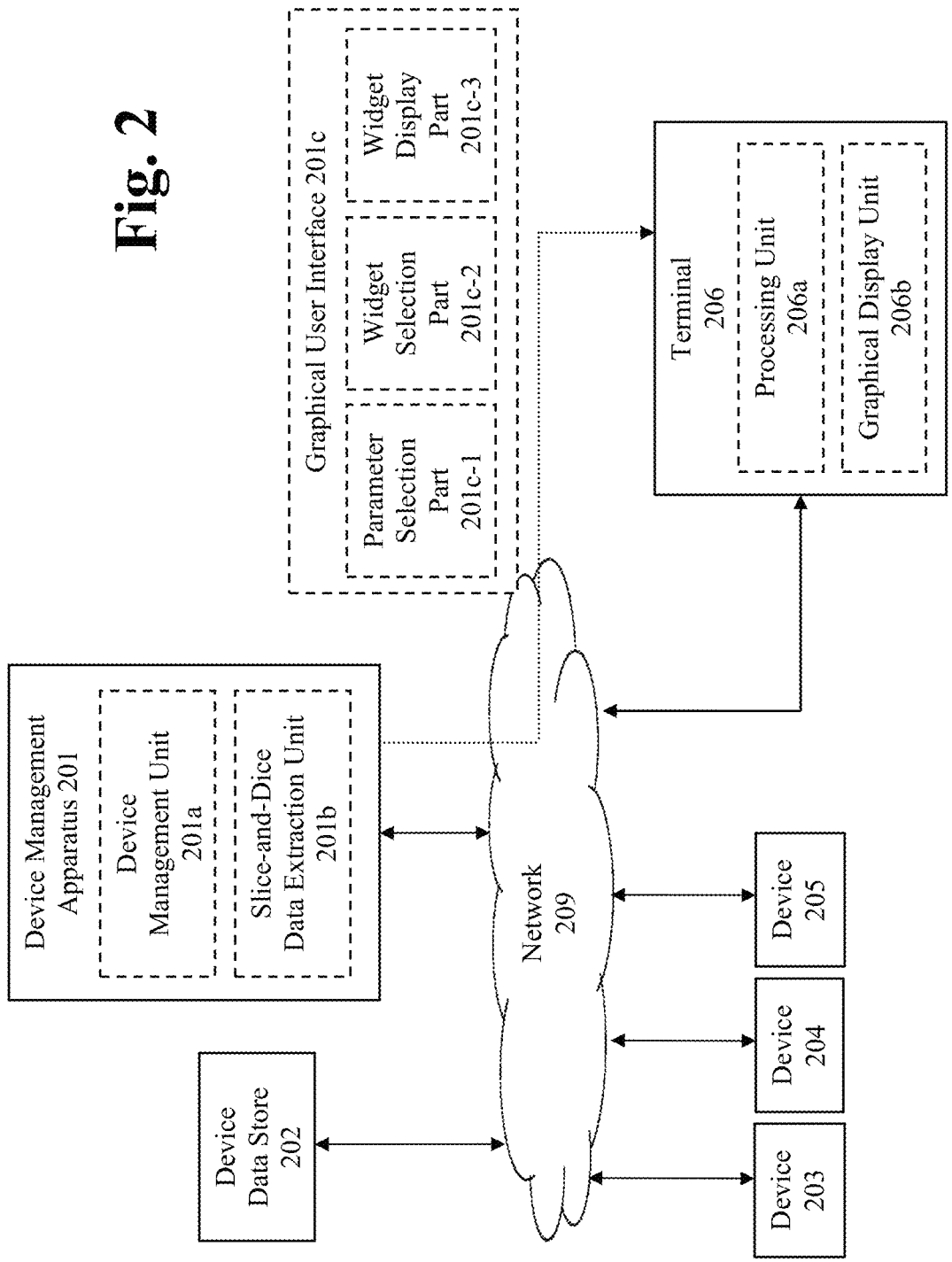
FIG. 2 shows a block diagram of a system for managing a plurality of network-connected devices, according to an exemplary embodiment.

For example, FIG. 2 shows schematically a system 200 for managing a plurality of devices connected to a network, according to an exemplary embodiment. The system 200 includes a device management apparatus 201, a device data store 202, a plurality of network-connected devices 203-205, and a terminal 206, all of which are interconnected by a network 209.

The device management apparatus 201 includes a device management unit 201a which maintains and retrieves data in the device data store 202, which stores device data for the plurality of network-connected devices 203-205, and a slice-and-dice data extraction unit 201b which displays a graphical user interface (GUI) 201c to a user.

The device management unit 201a is configured to manage the network-connected devices 203-205 and collect device data from the network-connected devices 203-205.

An example of device data collected by the device management unit 201a from the network devices 203-205 is illustrated in FIG. 5. As seen in FIG. 5, the device data for each network-connected device may include a variety of attributes such as name, manufacturer, IP address, device age, status, firmware version and department. The information depicted in FIG. 5 is merely exemplary, and other network devices, device status information, device properties, device configuration information, and so forth, may be included in the device data collected by the data management units. As non-limiting examples, the device data may include one or more of the following for a given network device: device manufacturer; device model; device serial number; device type (printer, scanner, terminal, etc.); device location (physical address, geographic address, network address, IP address, MAC address, etc.); output technology (e.g., laser, inkjet solid ink, thermal, other technology, etc.); device location type (e.g., production/copy center, in a specific workgroup area, etc.); scope (e.g., within the scope of administrative responsibility of a particular IT administrator, outside the scope of administrative responsibility of particular IT administrator, etc.); connection type (e.g., network connected, workstation/local connected, non-connected, etc.); device age (e.g., <1 year, 1-2 years, 2-3 years, 3-4 years, 4-5 years, >5 years, etc.); functions (e.g., copy, fax, print, scan, copy/scan, copy/fax, copy/print, print/fax, print/scan, copy/print/fax, copy/print/scan, copy/print/fax/scan, etc.); firmware version (e.g., major version, minor version, etc.); installed applications (e.g., application name, major version, etc.); organization (e.g., different groups, sub-groups, levels, departments, divisions and so forth within a larger enterprise or institutional entity, such as management group, sales group, marketing group, research & development group, etc.); supply level (e.g., consumable types such as paper and toner>empty/low/ok, etc.); capability (e.g., color, economy color, monochrome only, color scan, duplex, A3, not A3, etc.); last status update (e.g., 10 minutes, 60 minutes, 6 hours, etc.); duplex usage (e.g., 2:1, 1:2, 2:2, Book Duplex, etc.); paper size usage (e.g., A3, A4, B4, etc.); pages per job (e.g., 1, 2, 6-10, etc.); pages per minute (PPM) range (e.g., 1-20 ppm, 41+ ppm, etc.); color technology (e.g., professional color, convenience color, etc.); audit results/analysis (e.g., devices which satisfied a particular audit or test, devices which did not satisfy a particular audit or test, etc.); and so forth.

The device data stored in the device data store 202 may also include error history information that includes a log of all errors occurring at the corresponding managed device, and usage history information indicating which users have the utilized the managed device and when such use has occurred. The usage history information may indicate, for example, a number of total impressions (e.g. pages) produced by a user, or a number of specific types of impressions (copy color, copy BW, print color, print BW, etc.) produced by a user.

The device management unit 201a communicates with one or more of the plurality of network-connected devices to collect and obtain the various device data corresponding to each device. Many printers and other devices store data indicating their attributes or properties in a Management Information Base (MIB). The MIB may conform with the SNMP (Simple Network Management Protocol) protocol, and properties information can be obtained directly from the MIB through SNMP queries. In this way, the device management unit 201a is configured to discover and/or poll the corresponding plurality of network devices to obtain the device data from the network devices.

The device management unit 201a may obtain the device data (such as the name, status, configuration information, error history, usage history, etc.) from each network device by monitoring a network to which the device is connected (i.e. network 209), and detecting and receiving one or more alert notifications or status updates transmitted to the network from any of the plurality of network-connected devices 203-205. For example, the device management unit 201a may receive the status updates by repeatedly transmitting requests to the network-connected devices 203-205 via the network 209, inquiring as to the status of each network device. In response, each network device may transmit status updates back to the device management unit 201a, wherein each status update indicates the device name, status, configuration information, error history, usage history, whether an error exists or has occurred at the network device, etc. Alternatively, each network-connected device 203-205 may automatically transmit status updates to the device management unit 201a (without waiting for requests or queries from the device management unit 201a), at regular intervals or whenever an error occurs at the network-connected device. The device management apparatus 201 may include locally resident hardware and/or software agents installed locally on each of the network-connected devices 203-205, which are configured to transmit the status updates directly to the device management unit 201a. The device data may be stored along with other data in the device data store 202, or alternatively, in a storage part resident in the device management apparatus 201 and retrieved as needed.

As discussed above, the device data store 202 stores the device data collected from the plurality of network-connected devices 203-205. Although the device data store 202 is shown as a device separate from the device management apparatus 201, the device data store 202 may be implemented as a storage unit locally resident in the device management apparatus 201.

Referring back to FIG. 2, the terminal 206 includes a processing unit 206*a* and a graphical display unit 206*b*. For example, the slice-and-dice data extraction unit 201*b* causes the graphical display unit 206*b* to display a graphical user interface 201*c*. The user at the terminal 206 (e.g. an administrator of the network environment managed and monitored by the device management apparatus 201) can analyze the information (e.g. in the form of graphs and tables) displayed via the graphical user interface 201*c*. The terminal 206 is further described infra with reference to FIG. 6B.

As shown in FIG. 2, the slice-and-dice data extraction unit 201*b* displays on the graphical display unit 206*b* a graphical user interface (GUI), which includes a parameter selection part 201*c*-1, a widget selection part 201*c*-2 and a widget display part 201*c*-3.

The parameter selection part 201*c*-1 allows the user to select a device data parameter that he or she is interested in examining. For example, if the user wishes to check how many of each type of network-connected devices are present in the network environment, the user may select a device data parameter called "device type". Other device data parameters may include device count, manufacturer name, color/monochrome split, network/USB split, page per minute (PPM), or any other parameter by which the network-connected devices can be categorized and dissected.

The widget selection part 201*c*-2 allows the user to select one or more graphical widget types from a plurality of candidate widget types. A widget is a user interface element that can include information and perform certain tasks, such as displaying a graph illustrating a particular set of device data. Here, graphical widgets are used to display to the user information regarding the plurality of network-connected devices in a more manageable and informative fashion. For example, rather than simply listing all the network-connected devices and their corresponding statuses, displaying a graph illustrating the percentage of network-connected devices that are currently out of order and a graph illustrating the breakdown of such out-of-order devices (e.g. by location, by manufacturer, etc) may be much more helpful to the user who is trying to get general sense of which devices are available and which devices are out of order in a given network environment.

The widget display part 201*c*-3 displays a graphical widget corresponding to the user-selected widget type and rendered to reflect data corresponding to the user-selected parameter of interest for the plurality of network-connected devices, retrieved from the device data store 202.

That is, the slice-and-dice extraction unit 201*b* generates, based on the device data retrieved from the device data store 202 and user selection of, for example, device data parameters and graphical widget types, a graphical representation of the device data that matches, both in its format and scope, the preference of the user.

Figure 7A:
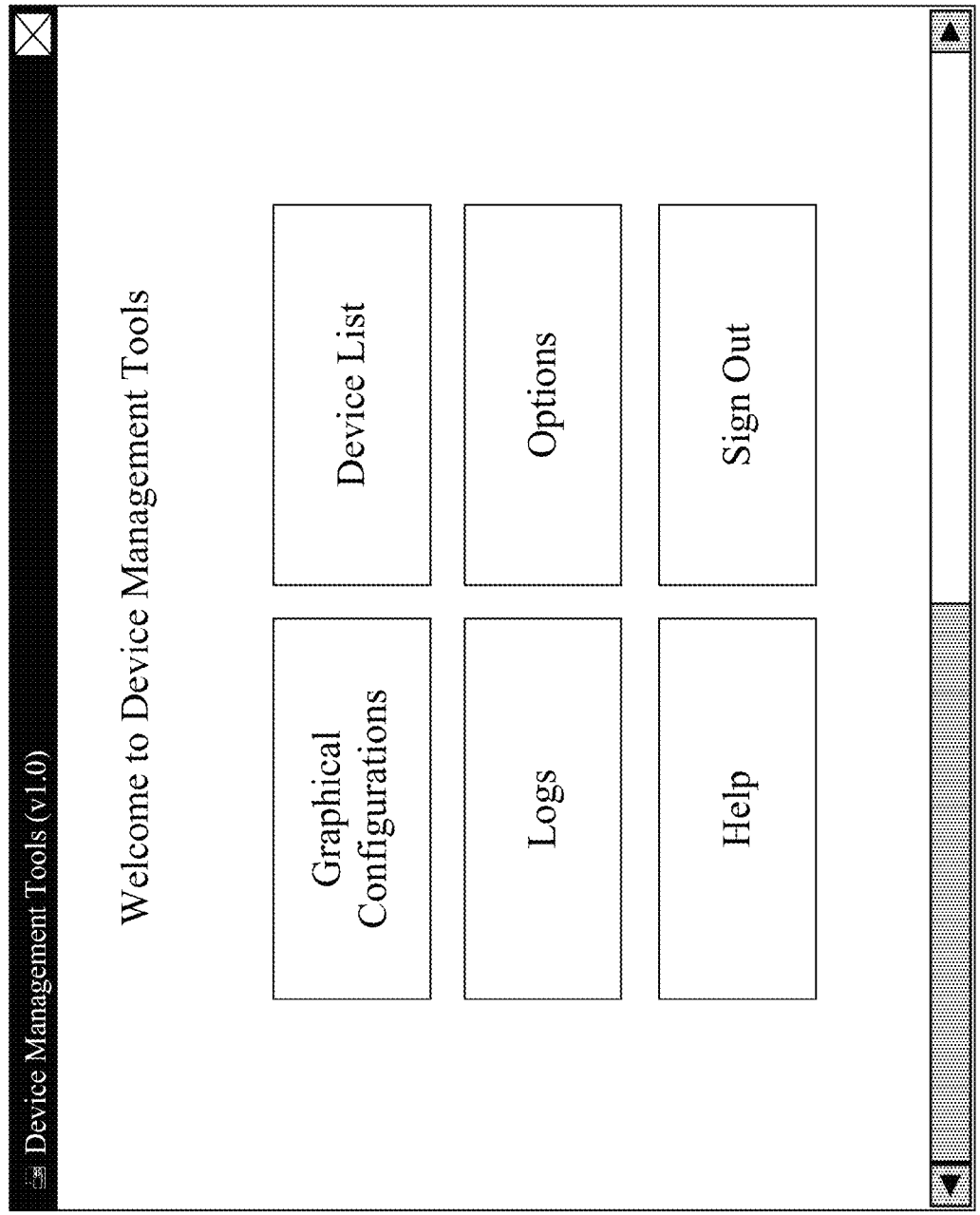
FIGS. 7A-7D show sample screenshots of a graphical user interface displayed to the user, according to an exemplary embodiment.
Figure 7B:
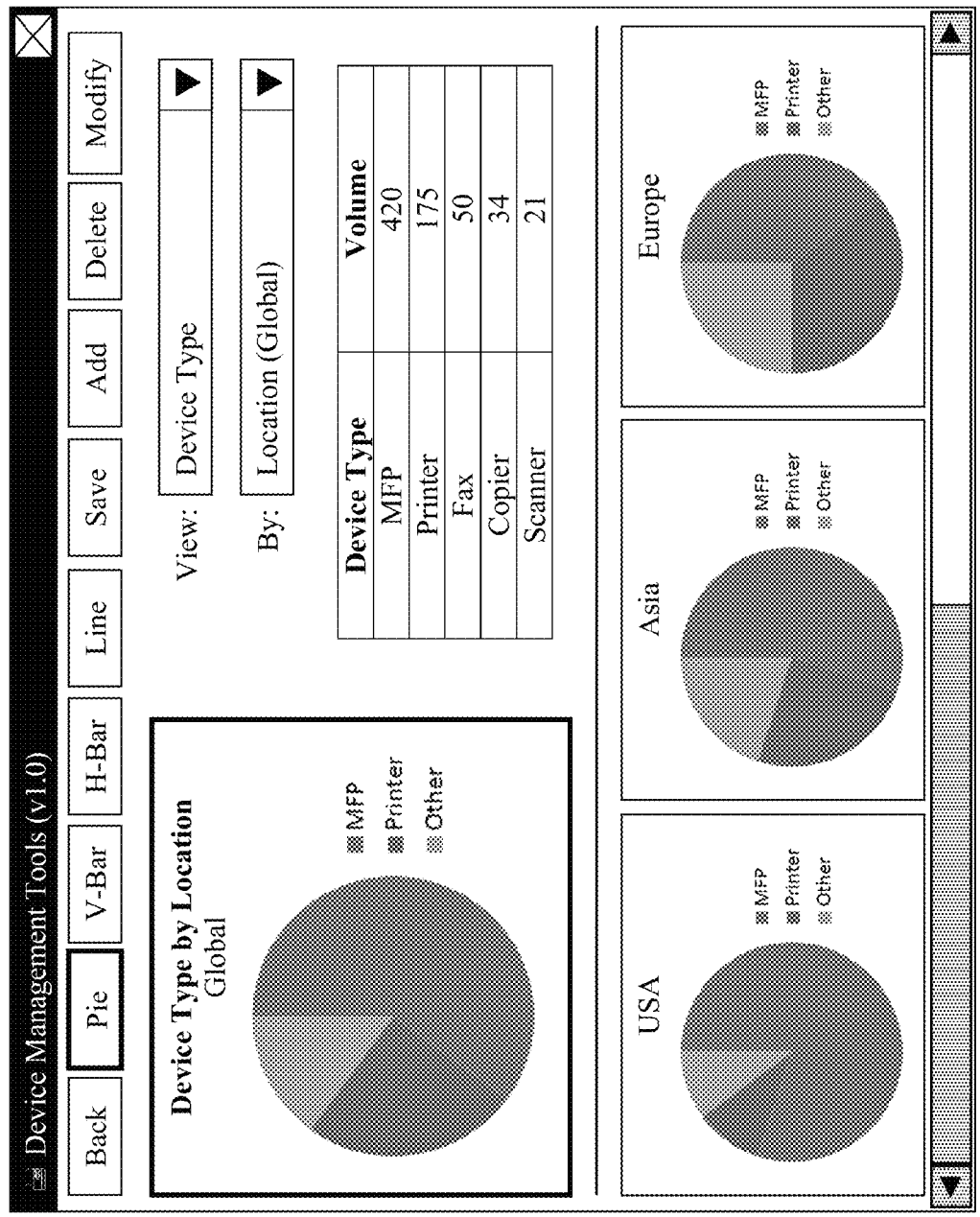

In FIG. 7B, a sample graphical user interface displayed via the graphical display unit of a terminal (e.g. the graphical display unit 206*b* of the terminal 206) is illustrated. Buttons are arranged at the top of the screen indicate the selectable widget types (along with other buttons for navigating through the application, such as back button and save button), and the pull-down menus to the right indicate the selectable parameters such as device type, location, manufacturer, etc. In the example shown in FIG. 7B, the user has selected parameters "device type" and "location" (e.g. the user wishes to view the count of different device types of network-connected devices and wants such count of network-devices to be grouped by location). As a result, the widget display part 203*c*-3 displays several graphical widgets, which are labeled "Global", "USA", "Asia", "Europe", and more (as indicated by the horizontal scroll bar at the bottom). The widget display part 203*c*-3 also displays a table corresponding to the graphical widget labeled "Global" (e.g. the count of each device type in the entire enterprise environment).

In addition, the slice-and-dice data extraction unit 201*b* automatically updates the widget display part 201*c*-3 upon user selection of another data parameter or another widget type, or upon change of the device data stored in the device data store 202. For example, when the user changes his or her selection of the data parameter from "device age" to "device status", such change is communicated to the slice-and-dice data extraction unit 201*b*, and the slice-and-dice data extraction unit 201*b* generates a new graphical widget based on the new data parameter (i.e. device status) to be displayed on the graphical display unit 206*b*. Similarly, when the portion of the device data used to generate the graphical widgets displayed in the widget display part 201*c*-3 of the GUI 201*c* changes (e.g. the GUI 201*c* includes a "device status" graph and the statuses of one or more devices change), such change is communicated to the slice-and-dice data extraction unit 201*b*, and the slice-and-dice data extraction unit 201*b* generates a new set of widgets to reflect the change in the device data and displays the new set of widgets in the GUI 201*c*.

Alternatively, the device management unit 201*a* may periodically provide the slice-and-dice data extraction unit 201*b* with an updated set of device data such that the widgets created by the slice-and-dice data extraction unit 201*b* reflect the device data that is up-to-date.

Referring back to FIG. 2, the network-connected devices 203-205 may include, for example, a printer, a scanner and/or a multi-function device (MFD). While this example of this disclosure simply refers to network-connected devices 203-205 in the interest of brevity, the aspects of this disclosure are applicable to a network environment having an arbitrary number of devices.

The network 209 can be a local area network, a wide area network or any type of network such as an intranet, an extranet (for example, to provide controlled access to external users, for example through the Internet), the Internet, etc., or a combination thereof. Further, other communications links (such as a virtual private network, a wireless link, etc.) may be used as well for the network 209. In addition, the network 209 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference. Although the network-connected devices 203-205 depicted in FIG. 2 are shown as being connected to one or more networks, the aspects of this disclosure may be applied to a system for managing a device that is not connected to a network but utilizes instead point-to-point communication, such as radio-frequency identification (RFID) technology. Such technology is well-known in the art and a description thereof is omitted in the interest of brevity.

Figure 3:
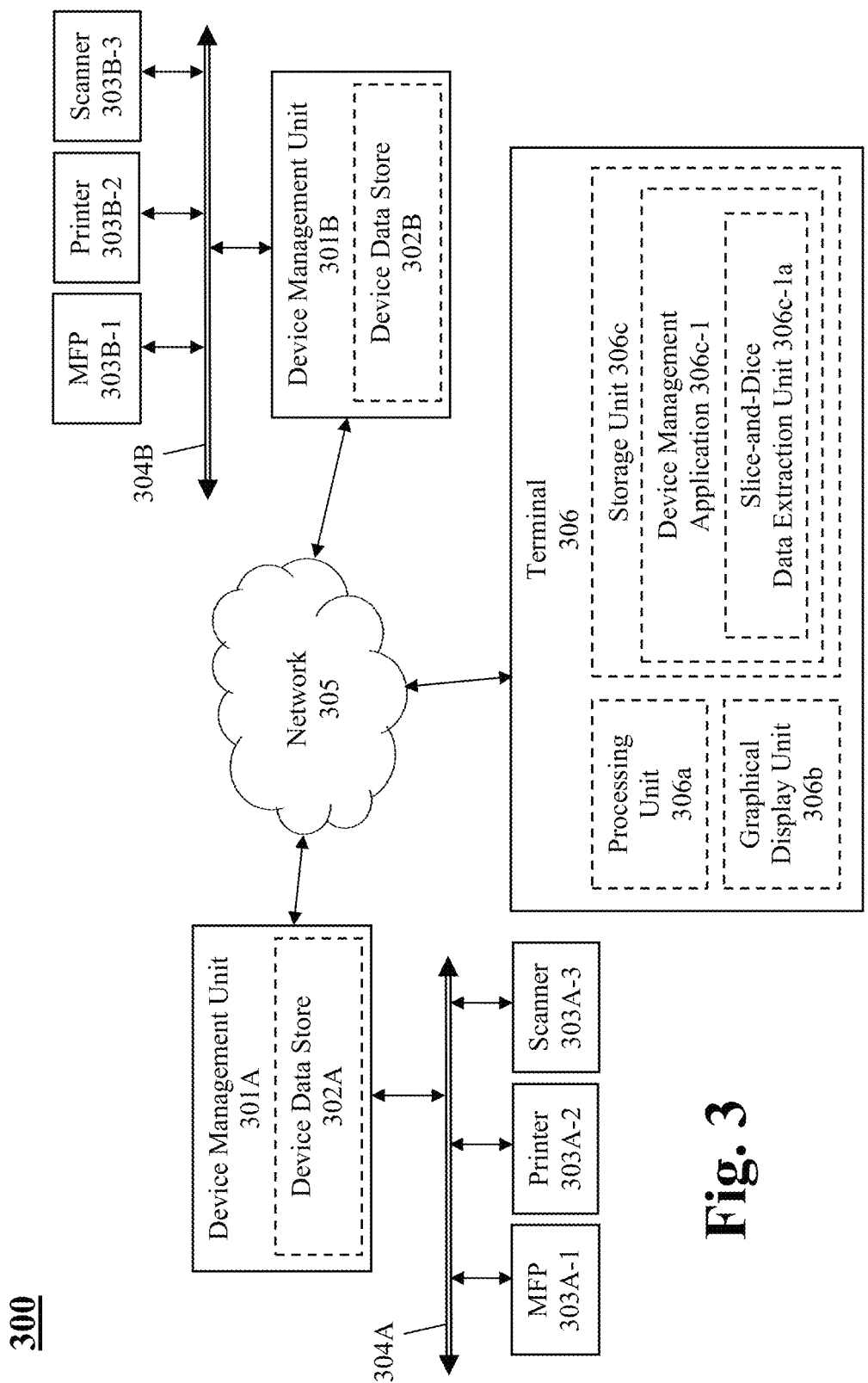
FIG. 3 shows a block diagram of a system for managing a plurality of network-connected devices, according to another exemplary embodiment.

With reference to FIG. 3, a system for managing a plurality of network-connected devices, according to another exemplary embodiment, is described below.

The example of FIG. 3 includes a system 300 which includes a device management unit 301A, an MFP 303A-1, a printer 303A-2 and a scanner 303A-3, all of which are interconnected by a network 304A (collectively "Network A"), a device management unit 301B, a device data store 302B, an MFP 303B-1, a printer 303B-2 and a scanner 303B-3, all of which are interconnected by a network 304B (collectively "Network B"), and a terminal 306. The device management units 301A and 301B and the terminal 306 are connected via a network 305. In addition, the device management unit 301A includes a device data store 302A, and the device management unit 301B includes a device data store 302B.

The terminal 306 includes a processing unit 306a, a graphical display unit 306b and a storage unit 306c. The operations of the processing unit 306a and the graphical display unit 306b are similar to those of the processing unit 206a and the graphical display unit 206b discussed in connection with FIG. 2, respectively. The storage unit 306c includes a device management application 306c-1 having a slice-and-dice data extraction unit 306c-1a. Upon the execution of the device management application 306c-1 by the processing unit 306a, a graphical user interface similar to that described with reference to FIG. 2 is displayed on the graphical display unit 306b. The slice-and-dice data extraction unit 306c-1a of the device management application 306c-1 communicates with the device management units 301 to obtain device data from the device data stores 302A and 302B.

Although each of Network A and Network B has a separate device data store in the system 300 of FIG. 3, the system 300 may also have a central device data store connected to the network 305, and the device management units 301A and 301B may store and retrieve data to and from such central device data store (and the slice-and-dice data extraction unit 306c-1a may obtain the device data from such central device data store).

Otherwise, operations of the elements of the system 300 are similar to those discussed in connection with the corresponding elements of the system 200 of FIG. 2.

Figure 4:
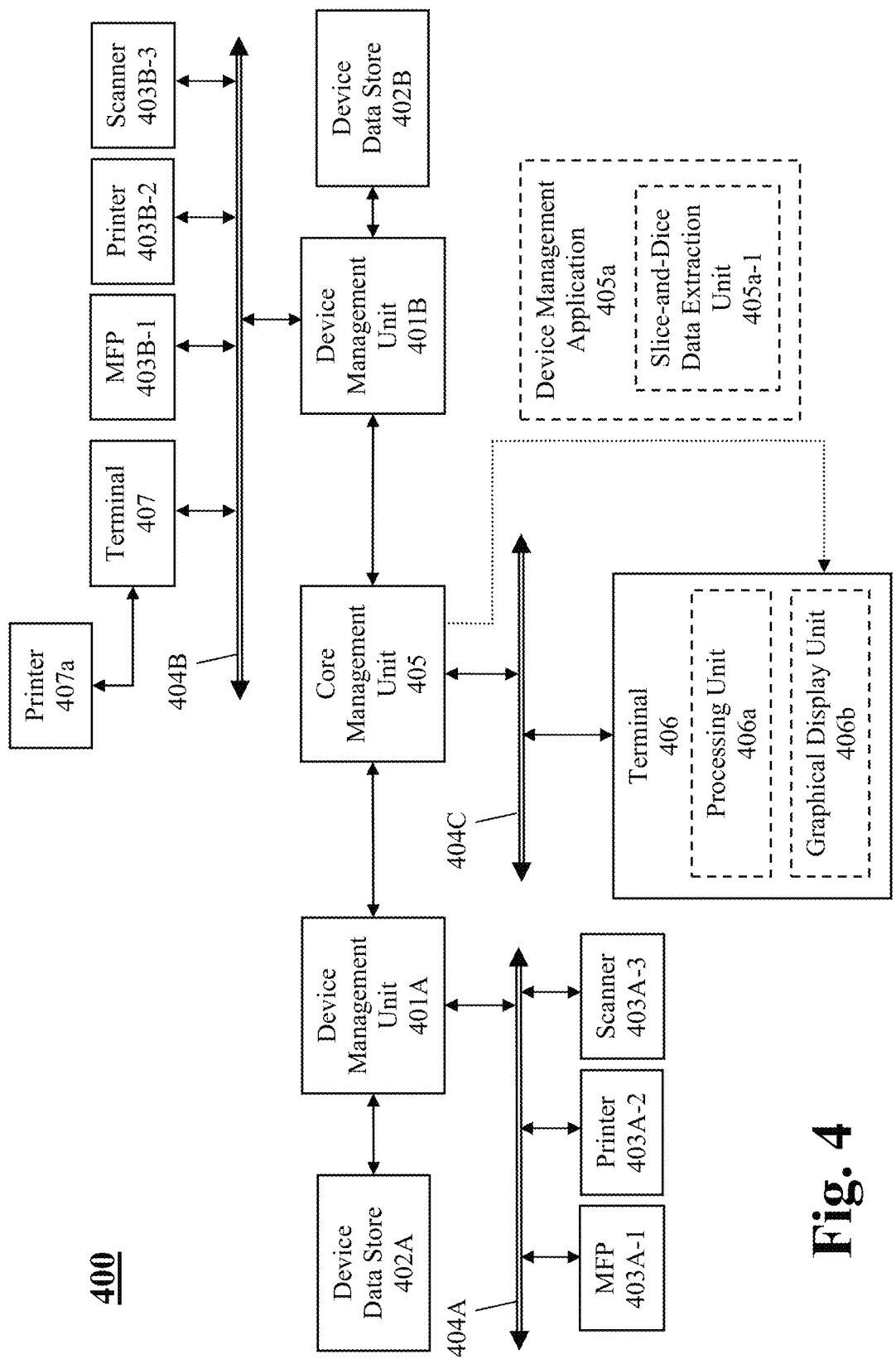
FIG. 4 shows a block diagram of a system for managing a plurality of network-connected devices, according to another exemplary embodiment.

With reference to FIG. 4, a system for managing a plurality of network-connected devices, according to another exemplary embodiment, is described below.

The example of FIG. 4 includes a system 400 which includes a device management unit 401A, an MFP 403A-1, a printer 403A-2 and a scanner 403A-3, all of which are interconnected by a network 404A (collectively "Network A"), a device management unit 401B, an MFP 403B-1, a printer 403B-2 and a scanner 403B-3, all of which are interconnected by a network 404B (collectively "Network B"), and a terminal 406 which is connected to a core management unit 405 via a network 404c (collectively "Network C"). In addition, a device data store 402A is connected to the device management unit 401A and a device data store 402B is connected to the device management unit 401B.

Network B further includes a terminal 407 which is connected to a printer 407a using, for example, a universal serial bus (USB) cable or a parallel cable. The device data of such printer 407a may be collected by the device management unit 401B via the terminal 407.

The device management units 401A and 401B each communicates with a core management unit 405 via networks 408 and 409, respectively. The core management unit 405 transmits the device management application 405a including a slice-and-dice data extraction unit 405a-1 to the terminal 406. When the device management application 405a is executed by the processing unit 406a, a graphical user interface is displayed on the graphical display unit 406b of the terminal 406.

The core management unit 405 and/or the device management units 401 may be realized by a computer program product including a computer-usable, non-transient medium (such as a disk storage apparatus) having instructions tangibly embodied therein that are executed by a computer. Thus, it should be understood that the core management unit 405 and/or the device management units 401 may be executed on a computer. While the core management unit 405 and/or the device management units 401 are shown as being external to the network devices, the core management unit 405 and/or the device management units 401 may in fact be executed on a client terminal and/or network-connected device.

The core management unit 405 and/or the device management units 401 may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

As an example, the core management unit 405 may be used by a super administrator who is in charge of managing an entire enterprise network which may include plural regional networks. In contrast, each local administrator may be in charge of managing one of such plural regional networks via the device management unit 401.

In the example of FIG. 4, only three networks (Networks A-C) are shown in the interest of brevity, but the system 400 is not limited to such configuration. The core management unit 405 may be connected to an arbitrary number of device management units 401 and other devices (e.g. terminal 406).

Otherwise, operations of the elements of the system 400 are similar to those discussed in connection with the corresponding elements of the system 200 of FIG. 2.

Figure 6A:
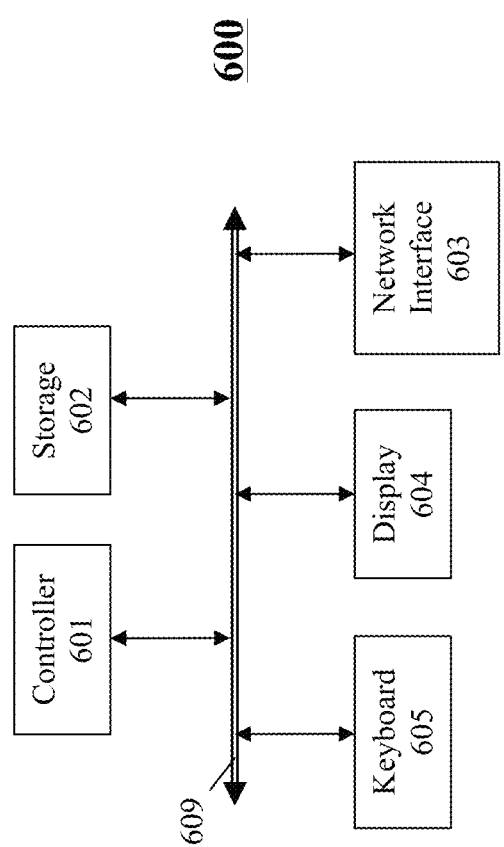
FIG. 6A shows a block diagram of an exemplary configuration of a device (data) management unit, such as illustrated in FIGS. 2-4.

FIG. 6A shows an exemplary configuration of a computing device that can be configured (for example, through software) to operate (at least in part) as the core management unit 405 of FIG. 4 and/or device management units 301 and 401 illustrated in FIGS. 3 and 4. As shown in FIG. 6A, the management unit 600 includes a controller (or central processing unit) 601 that communicates with a number of other components, including memory or storage part 602, network interface 603, display 604 and keyboard 605, by way of a system bus 609.

The management unit 600 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In the management unit 600, the controller 601 executes program code instructions that controls device operations. The controller 601, memory/storage 602, network interface 603, display 604 and keyboard 605 are conventional, and therefore in order to avoid occluding the inventive aspects of this disclosure, such conventional aspects will not be discussed in detail herein.

The management unit 600 includes the network interface 603 for communications through a network, such as communications through the network 209 with the network-connected devices 203-205 in FIG. 2. However, it should be appreciated that the subject matter of this disclosure is not limited to such configuration. For example, the management unit 600 may communicate with client terminals through direct connections and/or through a network to which some components are not connected. As another example, the management unit 600 does not need to be provided by a server that services terminals, but rather may communicate with the devices on a peer basis, or in another fashion.

The core management unit and/or the device management units of the present disclosure are not limited to a server or computer, but can be manifested in any of various devices that can be configured to communicate over a network and/or the Internet.

Figure 6B:
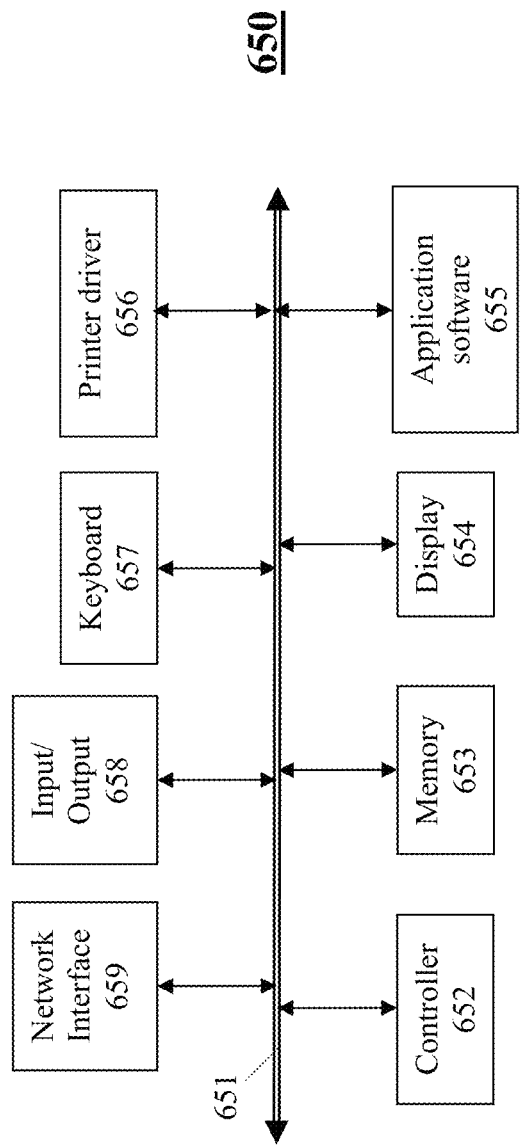
FIG. 6B shows a block diagram of an exemplary configuration of a terminal, such as illustrated in FIGS. 2-4.

An example of a configuration of the terminal 206 of FIG. 2 and/or the terminal 407 of FIG. 4 (for example, as a computer) is shown schematically in FIG. 6B. In FIG. 6B, computer 650 includes a controller (or central processing unit) 652 that communicates with a number of other components, including memory 653, display 654, keyboard (and/or keypad) 657, other input/output (such as mouse, touchpad, stylus, microphone and/or speaker with voice/speech interface and/or recognition software, etc.) 658, network interface 659, print driver 656 and application software 655, by way of an internal bus 651.

The memory 653 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 659 provides a connection (for example, by way of an Ethernet connection or other network connection which supports any desired network protocol such as, but not limited to TCP/IP, IPX, IPX/SPX, or NetBEUI) to the network to which the computer 650 is connected (e.g. network 209 of FIG. 2).

Print driver 656 and application software 655 are shown as components connected to the internal bus 651, but in practice are typically stored in storage media such as a hard disk or portable media, and/or received through the network, and loaded into memory 653 as the need arises.

Depending on the type of the particular terminal device, one or more of the components shown in FIG. 6B may be missing. For example, a particular mobile phone may be missing the print driver 656 and the keyboard 657.

Additional aspects or components of the computer 650 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Each of the network-connected devices 203-205 of FIG. 2 may be any device including but not limited to a personal, notebook or workstation computer, a terminal, a kiosk, a personal digital assistant (PDA), a tablet computing device, a smartphone, a scanner, a printer, a facsimile machine, a multi-function device (MFD), a server, a mobile phone or handset, another information terminal, etc. Each network-connected device may be configured with software allowing the network-connected device to communicate through a network with device management units (e.g. device management apparatus 201 of FIG. 2, device management units 301 and 401 of FIGS. 3 and 4 and/or core management unit 405 of FIG. 4).

Figure 6C:
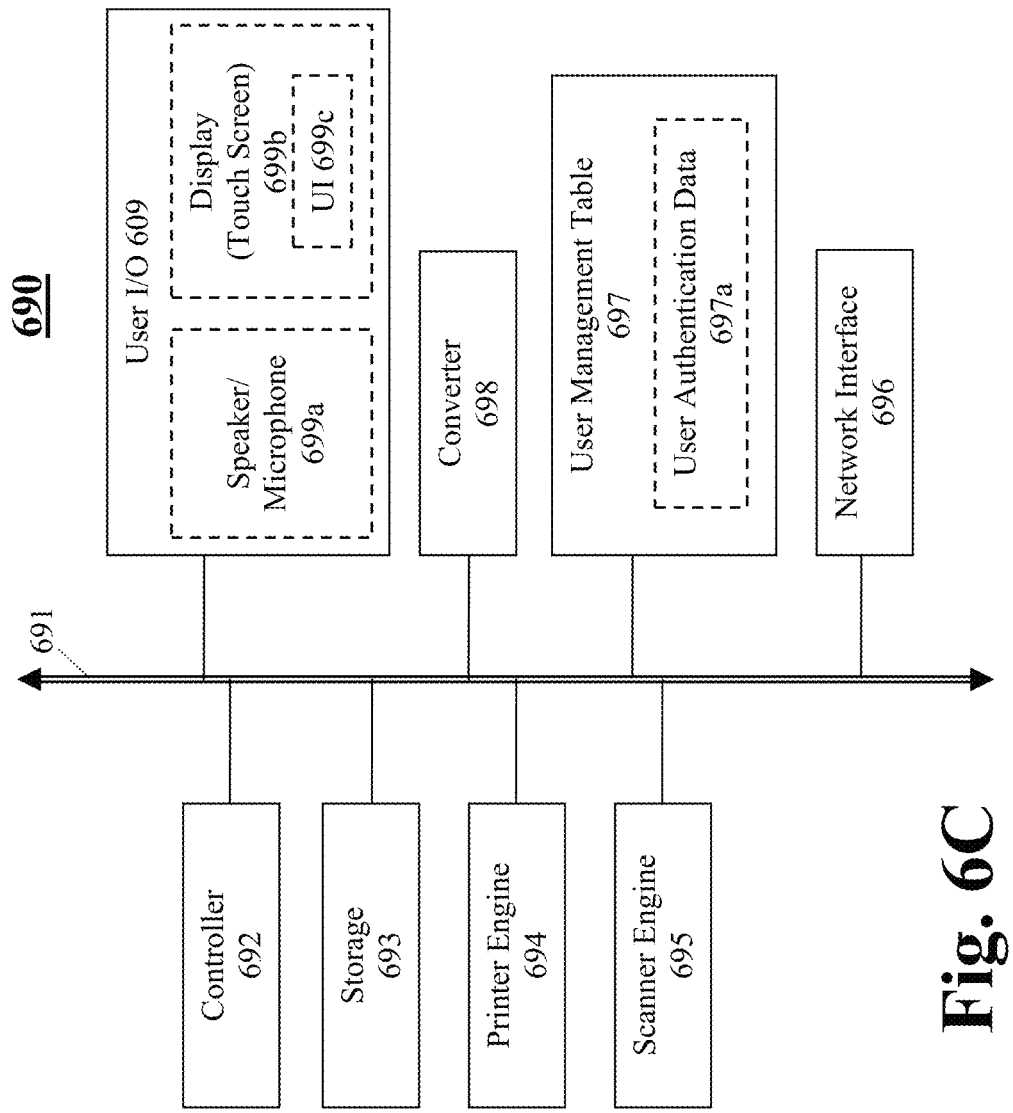
FIG. 6C shows a block diagram of an exemplary configuration of a multi-function device, such as illustrated in FIGS. 3 and 4.

FIG. 6C shows a schematic diagram of a configuration of a network-connected device as an MFD, according to an exemplary embodiment, which can be any apparatus (including a microprocessor chip or a collection of devices having varying degree of integration) that has the ability to perform two or more functionalities.

The MFD 690 shown in FIG. 6C includes a controller 692, and various elements connected to the controller 692 by an internal bus 691. The controller 692 controls and monitors operations of the MFD 690. The elements connected to the controller 692 include storage 693 (for example, random access memory, read-only memory, hard disk drive, portable storage media drive such as for optical discs, magnetic discs, magneto-optical discs, etc., semiconductor memory cards, combinations of storage media, etc.), printer engine 694, scanner engine 695, network interface (I/F) 696, converter 698 for converting data from one format to another format (for example, a format suitable for printing, faxing, e-mailing, etc.), and user I/O (Input/Output) 699. The controller 692 also utilizes information stored in user management table 697 to authenticate the user and control user access to the functionalities of the MFD 690.

Storage 693 can include one or more storage parts or devices [e.g. a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 693 and executed by the controller 692 to carry out the instructions. Such instructions can include instructions for performing specified functions (such as printing, scanning, faxing, copying, e-mailing, etc.) of the MFD 690, to enable the MFD 690 to interact with a terminal, as well as perhaps other external devices, through the network interface 696, and to control the converter 698, access data in the user management table 697, and interactions with users through the user I/O 699.

The network interface 696 is utilized by the MFD 690 to communicate with other network-connected devices such as a terminal or a device management unit (e.g., device management apparatus 201 of FIG. 2) and receive data requests, print jobs, user interfaces, and etc.

The user I/O 699 includes one or more display screens that display, under control of controller 692, information allowing the user of the MFD 690 to interact with the MFD 690. The display screen can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFD 690, so as to allow the operator to interact conveniently with services provided on the MFD 690, or with the MFD 690 serving as terminal for accessing electronic data or other content through the network. User interfaces or other contents received through the network via the network interface 696 can be displayed on the display screen.

The display screen does not need to be integral with, or embedded in, a housing of the MFD 690, but may simply be coupled to the MFD 690 by either a wire or a wireless connection. The user I/O 699 may include keys and/or buttons (such as graphical keys or buttons, or other graphical elements, of a GUI on a touchscreen display) for inputting information or requesting various operations. Alternatively, the user I/O 699 and the display screen may be operated by a keyboard, a mouse, a remote control, voice recognition (e.g., through a speaker/microphone 699a), or eye-movement tracking, or a combination thereof.

Printer engine 694, scanner engine 695 and network interface 696 are otherwise conventional, and therefore, a detailed description of such conventional aspects is omitted in the interest of clarity and brevity.

The MFD 690 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

The MFD 690 may also operate as a device management apparatus (e.g. device management apparatus 201 of FIG. 2). The operation of such device management apparatus according to an exemplary embodiment is described supra with reference to FIG. 2.

FIG. 7A shows a screenshot of a main menu in an application software product for providing device management services, according to an exemplary embodiment. Such main menu screen is displayed on the terminal device of the user when the user successfully signs in, for example, by providing login credentials. In the example of FIG. 7A, the main menu screen has the following buttons: "graphical configurations" for displaying the graphical configurations (e.g. customized view of the network environment, which includes graphs and tables), "device list" for displaying the list of network devices in the network environment, "logs" for displaying a log file which records various events that occur in the network environment managed by the device management application, "options" for allowing the user to configure various settings that govern the operation of the device management application, and "sign out" for signing out of the device management application.

FIG. 7B shows a screenshot of a graphical user interface (GUI) according to an exemplary embodiment. The graphical user interface can be divided, for example, into three parts: a widget selection part, a parameter selection part, and a widget display part. In the GUI shown in FIG. 7B, the widget selection part is the top portion of the GUI where the array of buttons is provided. A user (e.g. an administrator who monitors and manages the network environment) may specify the type of graphs (e.g. pie graph, vertical bar graph, horizontal bar graph and a line graph) to be used for displaying the data regarding the plurality of network-connected devices in the network environment. For example, in FIG. 7B, the pie graph button is selected (indicated by the bolded border thereof), and the data is displayed to the user as pie graphs. The parameter selection part, which is located in the top right corner of the GUI in this example, allows the user to specify what kind of device data the user is interested in analyzing.

For example, in FIG. 7B, the user has selected "device type" as one of the data parameters. In addition, the GUI may allow the user to select a subparameter associated with the selected data parameter, to drill down to the next level of display. That is, in FIG. 7B, the user has selected the subparameter "location" for displaying the device data corresponding to the selected data parameter for each location within the network environment (e.g. global enterprise environment). In this example, the user selection of the pie graph, "device type" and "location" causes the GUI to display, in the widget display part of the GUI, the device type of the plurality of network-connected devices in the network environment for various locations in a pie graph format. As shown in FIG. 7B, in the top left portion of the GUI, a pie graph that represents the entire global network is displayed, and at the bottom, the same analysis is performed for each country within the global network.

Figure 7C:
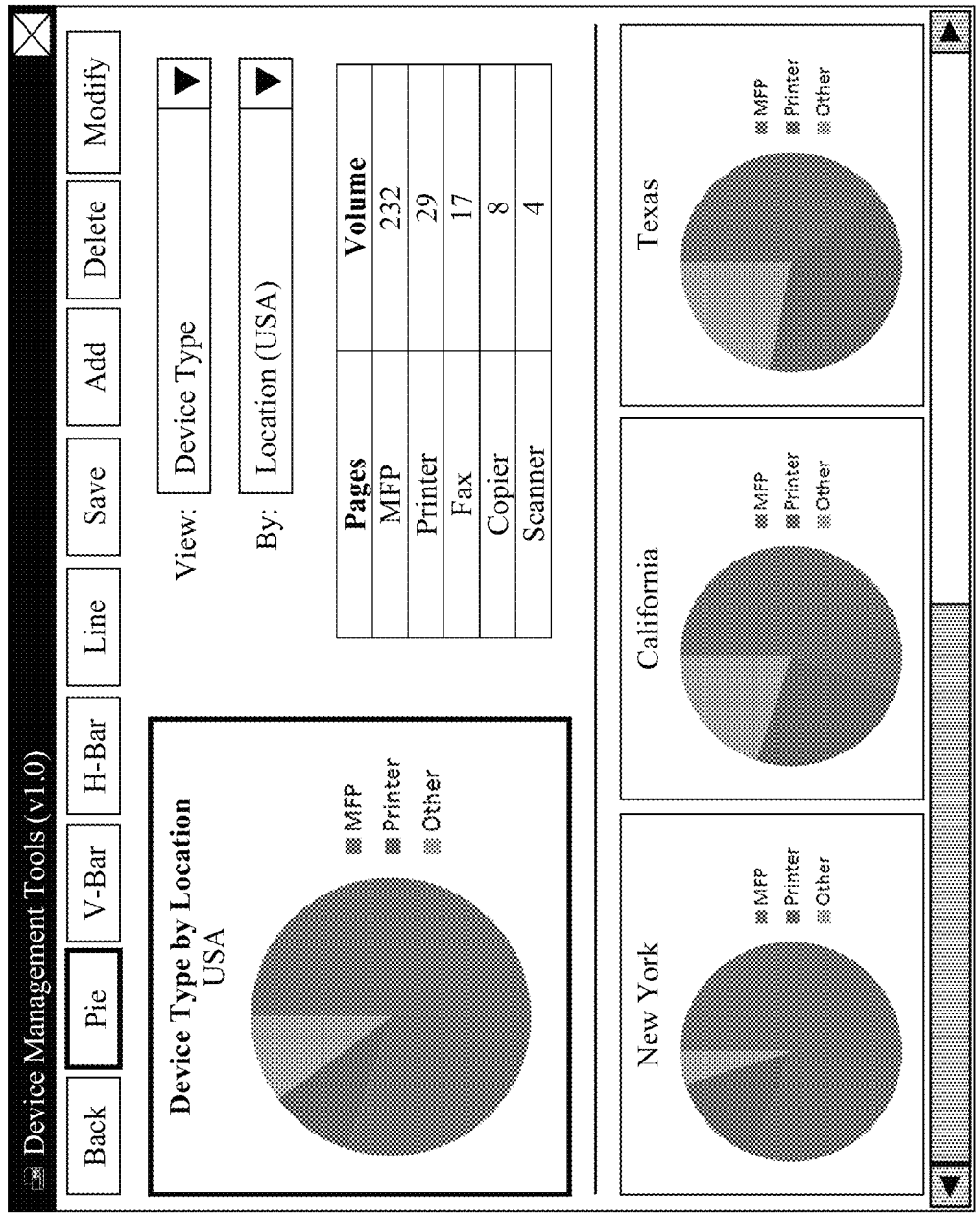

The user is allowed to further navigate through the displayed graphs, for example, by clicking on one of the graphs. In the example shown in FIG. 7B, upon the user further drilling down by clicking on the graph for "USA", the user is shown a new set of graphs, as illustrated in FIG. 7C. FIG. 7C is similar to FIG. 7B, but now a graph for the location "USA" is displayed at the top instead, and the graphs at the bottom are replaced by graphs for "New York", "California", "Texas" and etc., which are sub-regions of the location "USA". Thus, by clicking on the graph for the location "USA", the user may access a further breakdown of the device data within the selected location. Similarly, the user can further select one of the graphs for the locations "New York", "California" or "Texas" and see a further breakdown of the device data within the selected region.

Figure 7D:
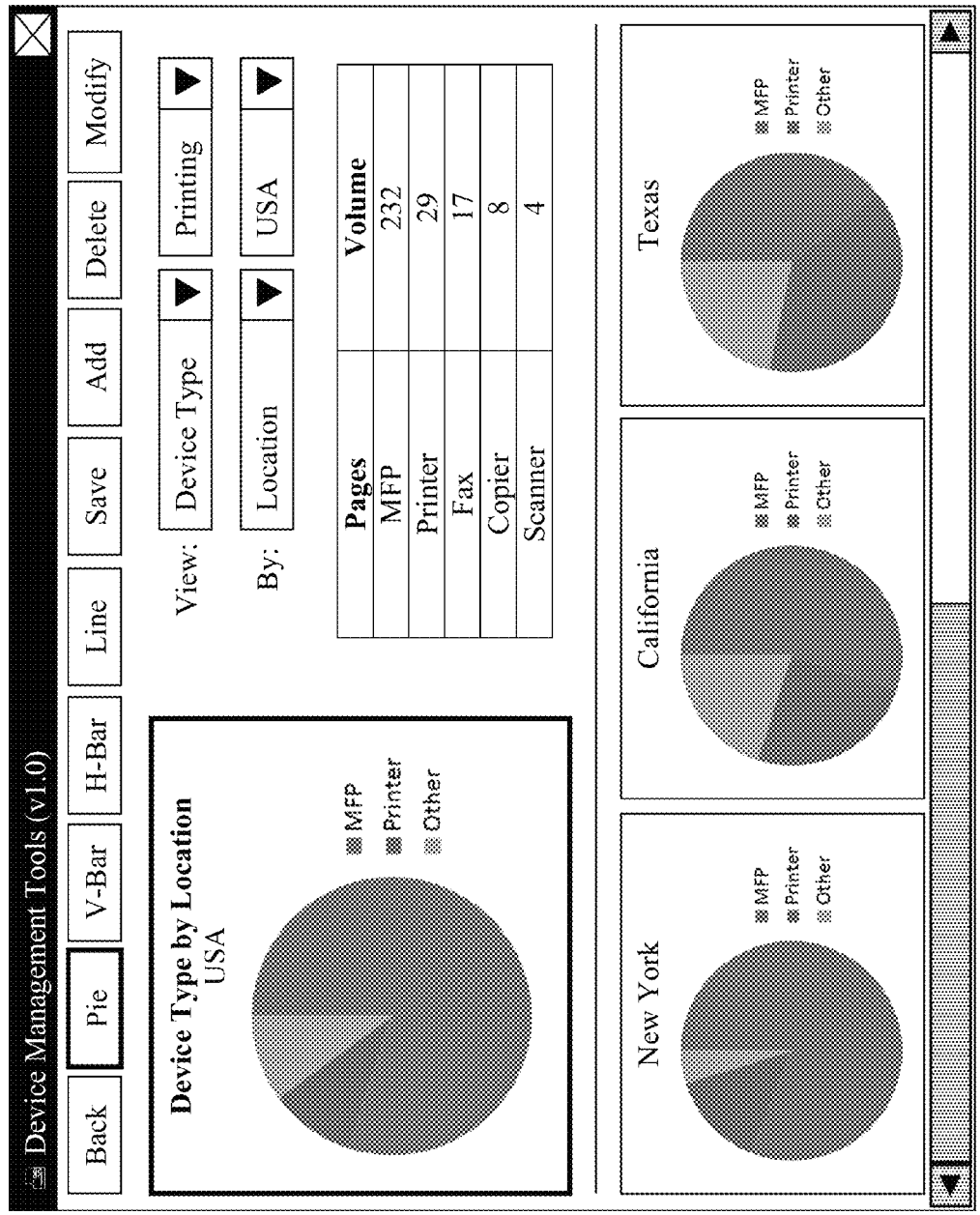

Alternatively, the parameter selection part of the GUI may list, for each applicable device data parameter (e.g. "device type", "location", etc.) a list of sub-parameters which further narrow down the device data corresponding to the device data parameter. For example, upon user selection of the device data parameter "device type", the GUI may display sub-parameters associated with the selected device data parameter, such as "printing device", "scanning device", "storage device", or "network device". Similarly, upon user selection of the device data parameter "location", the GUI may display sub-parameters such as "Global", and a list of various countries such as "USA". In the example of FIG. 7D, the sub-parameters "printing" and "USA" are selected, and the graphs illustrate a breakdown of the printing devices in the network environment in the USA (and states within the USA).

In each instance, the user can drill up incrementally from the current level of display to the immediately preceding level, by clicking the "Back" button at the top left portion of the GUI in FIGS. 7B-7D. Alternatively, at the user can start at the beginning of the navigation of display levels by specifying a new data parameter (i.e. using the "View:" parameter selection part) and optionally select a new sub-parameter.

It should be appreciated that FIGS. 7A-7D merely show examples of GUIs that can be provided and that the hierarchies of the GUIs that can be traversed by a user are user-definable. Accordingly, in the case of a hierarchy structured based on location in part, country does not need to be the top level of subparameters, but rather, the top level of subparameters may instead start at continents, or regions within a state, or at company locations, or any other parameter selected by the administrator. Further, although it might be popularly selected to employ a hierarchy that starts with, or in which the top level of subparameters starts with, location or geography, other starting points may be employed.

With reference to FIGS. 8A-8D, examples of the various ways in which the GUI can be configured to display the device data of the plurality of network-connected devices are shown.

Figure 8A:
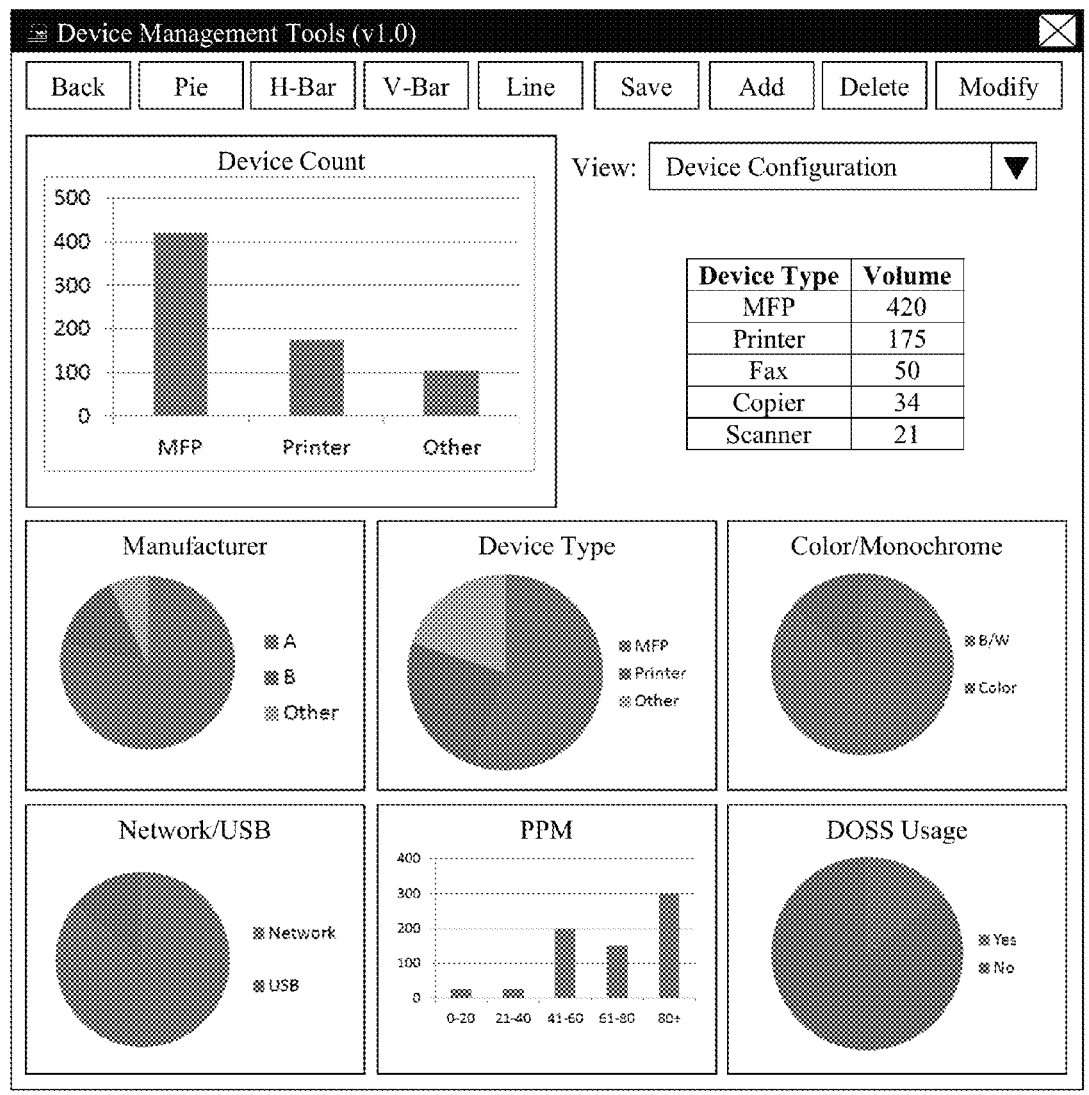
FIGS. 8A-8D show sample arrangements of graphs displayed to the user, according to an exemplary embodiment.

FIG. 8A shows a screenshot of a "device configuration" as indicated by the device data parameter shown in the top right portion of the GUI. In this example, the widget display part of the GUI includes a device count graph illustrating the number of each type of devices (e.g. MFP, Printer, etc.); a manufacturer graph illustrating the breakdown of manufacturers; a device type graph illustrating the breakdown of the different types of device; a color/monochrome graph illustrating the breakdown between the number of devices with color printing/scanning capabilities and the number of devices without such color capabilities; a network/USB graph illustrating the breakdown between network-connected devices and USB-connected devices; a PPM graph illustrating the page-per-minute of the devices; and a DOSS (Data Overwrite Security System, a system for overwriting data that is temporarily stored on the hard drive of digital multifunctional products by writing over the latent image with random sequences of 1's and 0's, thereby making any effort to access and reconstruct residual image data virtually impossible) usage graph illustrating the percentage of devices that are DOSS-enabled.

Figure 8B:
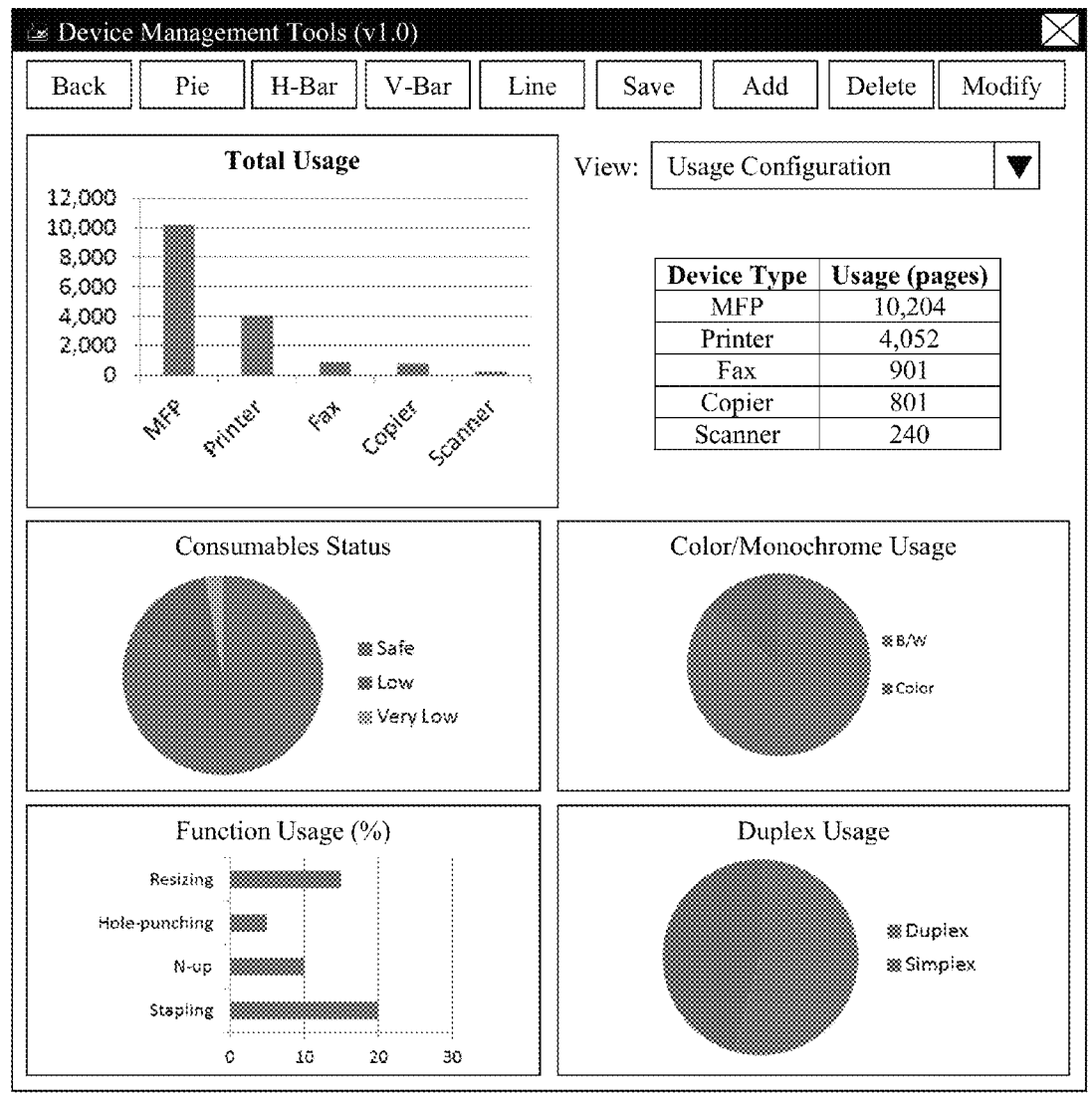

FIG. 8B shows a screenshot of a "usage configuration" as indicated by the device data parameter shown in the top right portion of the GUI. In this example, the widget display part of the GUI includes a total usage graph illustrating the number of pages printed, scanned, faxed, copied, etc. by each type of device; a consumables status graph illustrating the percentages of the devices that are fully stocked ("safe"), running low on consumables ("low"), and empty or nearly empty ("very low"); a color/monochrome usage graph illustrating the number of times the color functionalities and monochrome functionalities are used; a function usage graph illustrating the frequency of use of each type of functionality (e.g. resizing, hole-punching, N-up printing, stapling, etc.); and a duplex usage graph illustrating the frequency of use of the duplex and simplex printing.

Figure 8C:
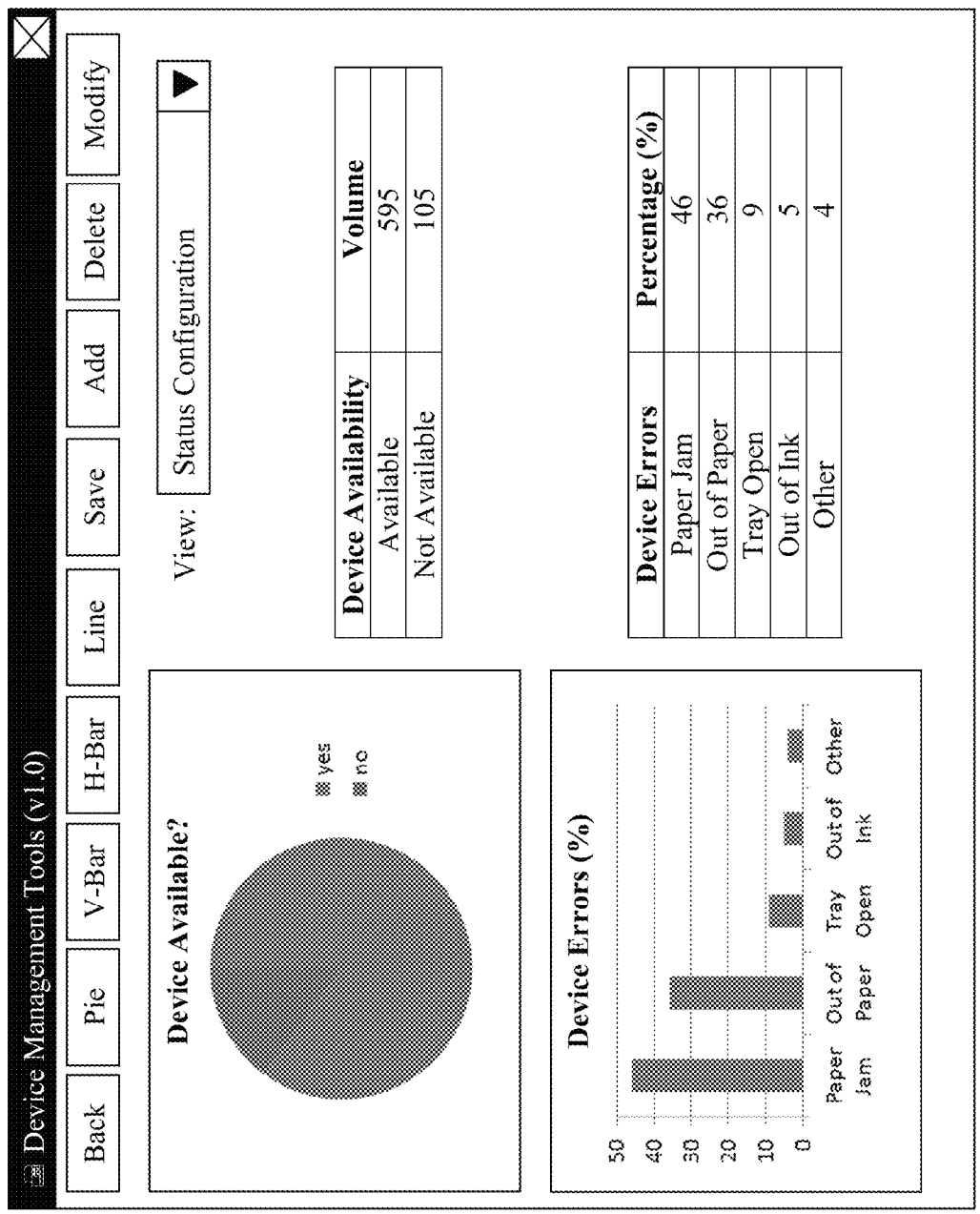

FIG. 8C shows a screenshot of a "status configuration" as indicated by the device data parameter shown in the top right portion of the GUI. In this example, the widget display part of the GUI includes a device availability graph illustrating the percentage of devices that are available out of all devices; and a device error graph illustrating the breakdown of the device errors that has occurred in the devices in the network environment.

Figure 8D:
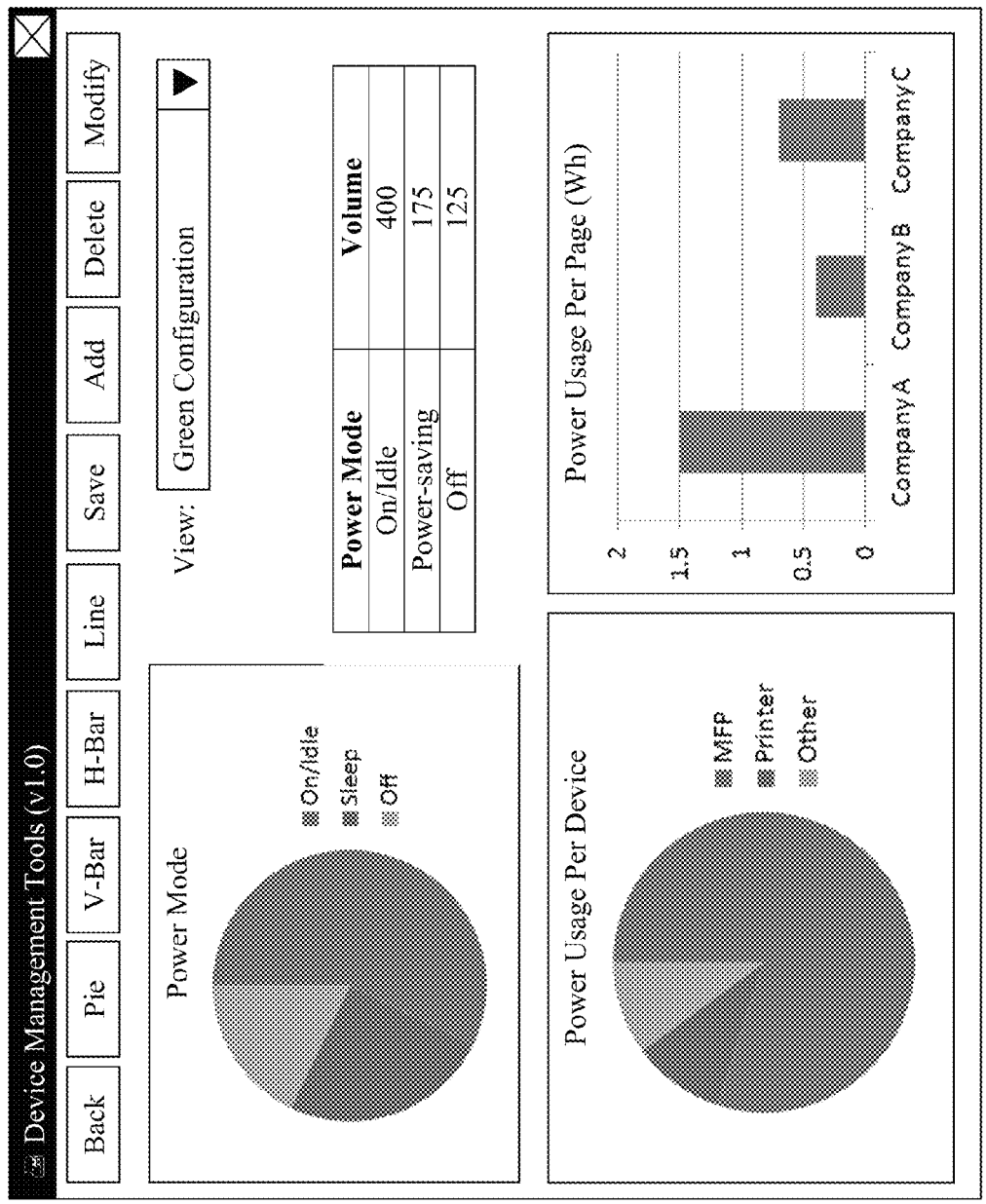

FIG. 8D shows a screenshot of a "green configuration" as indicated by the device data parameter shown in the top right portion of the GUI. In this example, the widget display part of the GUI includes a power mode graph illustrating the power mode status of the devices; a power usage per device graph illustrating how much power each type of device is consuming; and a power usage per page graph, illustrating how much power, on average, each device manufactured by a particular manufacturer is consuming per page (e.g. printing, faxing, copying, etc.).

Such configurations shown in FIGS. 8A-8D are mere examples and a variety of different configurations may be provided to the user.

Figure 9A:
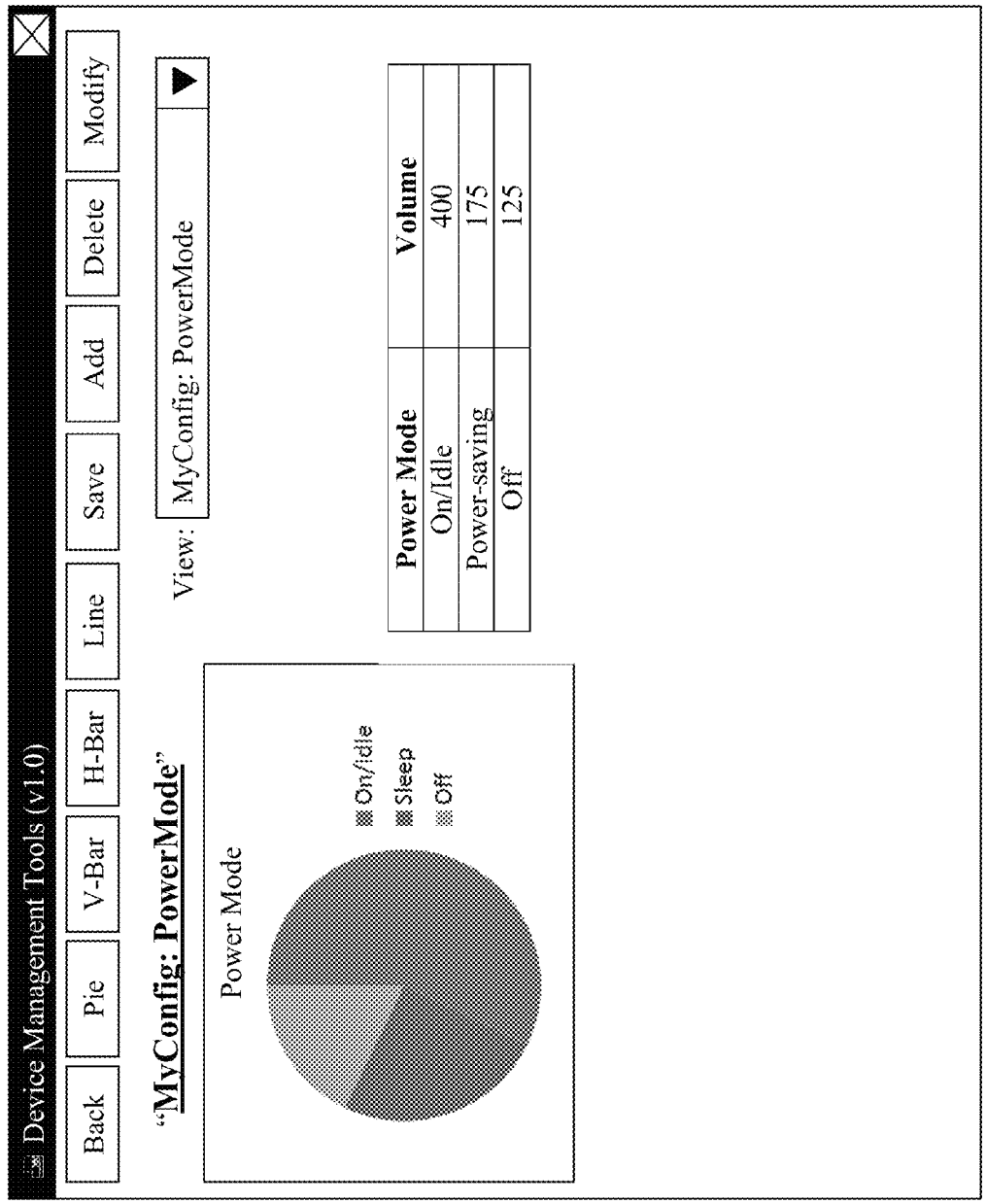
FIGS. 9A-9F show sample arrangements of graphs displayed to the user, according to an exemplary embodiment.
Figure 9B:
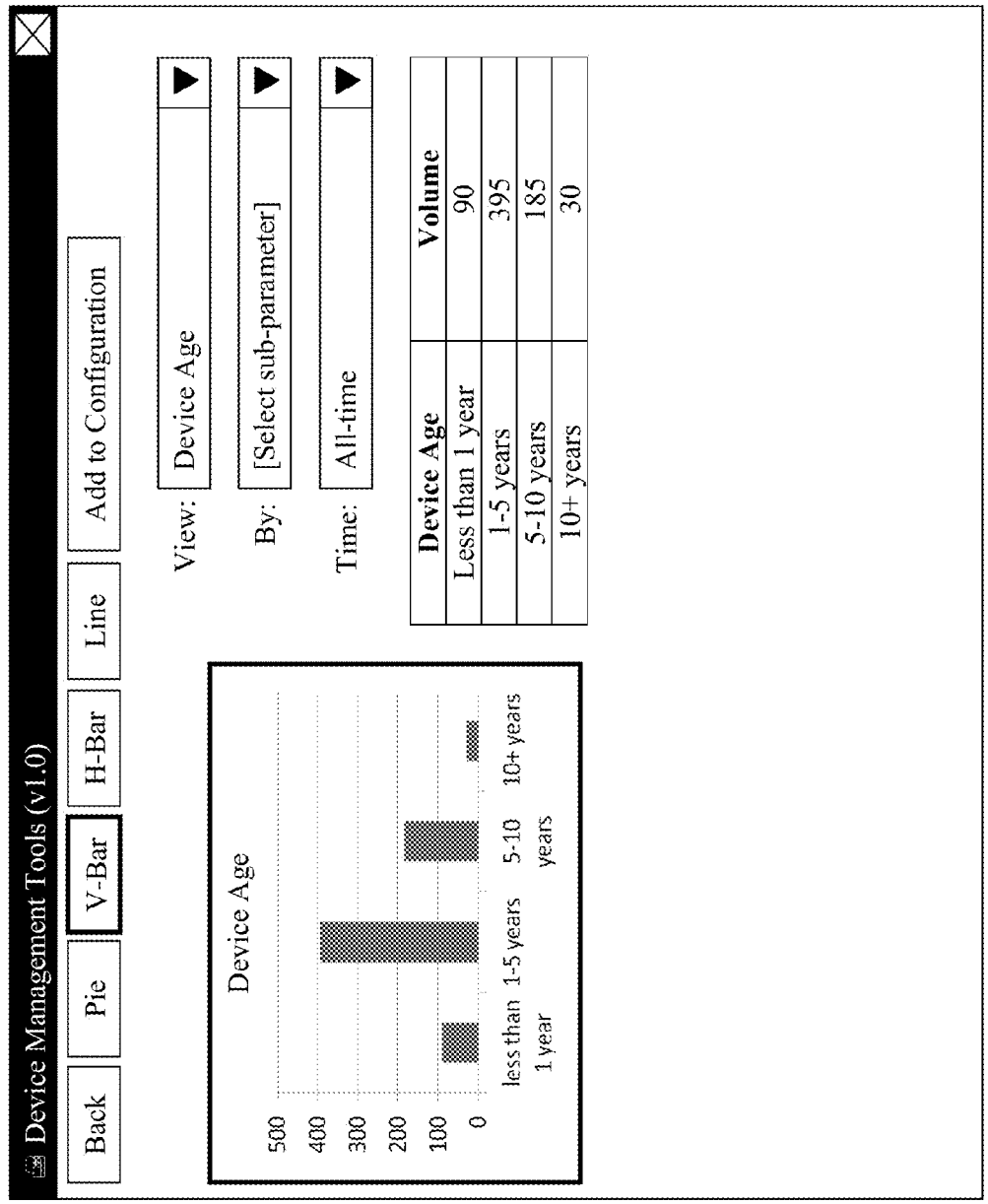

Turning now to FIG. 9A, there is shown a custom configuration labeled "MyConfig: PowerMode", which has a graph illustrating the breakdown of the power modes of the network-connected devices (e.g. "On/Idle", "Sleep" and "Off"). If the user wishes to add another graphical widget to the configuration shown in FIG. 9A, the user can do so by clicking on the "Add" button located at the top of the screen. Once the user has selected the "Add" button, a new screen for adding new widgets is displayed to the user, as shown in FIG. 9B. Here, the user can customize a new graphical widget and add it to the existing configuration (e.g. the configuration shown in FIG. 9A). For example, the user has selected the "device age" parameter but has not selected any subparameters associated with the "device age" parameter. Thus, a single graph illustrating the device age of the plurality of network-connected devices in the network environment is shown.

As shown in FIG. 9B, a specific time period can be specified to limit the device data to be analyzed. In this example, the user has specified "all-time" as the time period, but the time parameter may be useful for identifying recent trends. For example, by setting the time period to 1 month, the user can graph how many pages were printed by each printing device in the network environment.

Further, numerous time intervals may be specified to graph a series of time periods. For example, if a time period is set to 1 month, and a number of time periods to be graphed is set to 6, the specified device data parameter can be graphed for each of the past 6 months. If such device data is graphed for the device data parameter "power consumption", the user can quickly identify the trend in power consumption by the devices in the network environment.

Figure 9C:
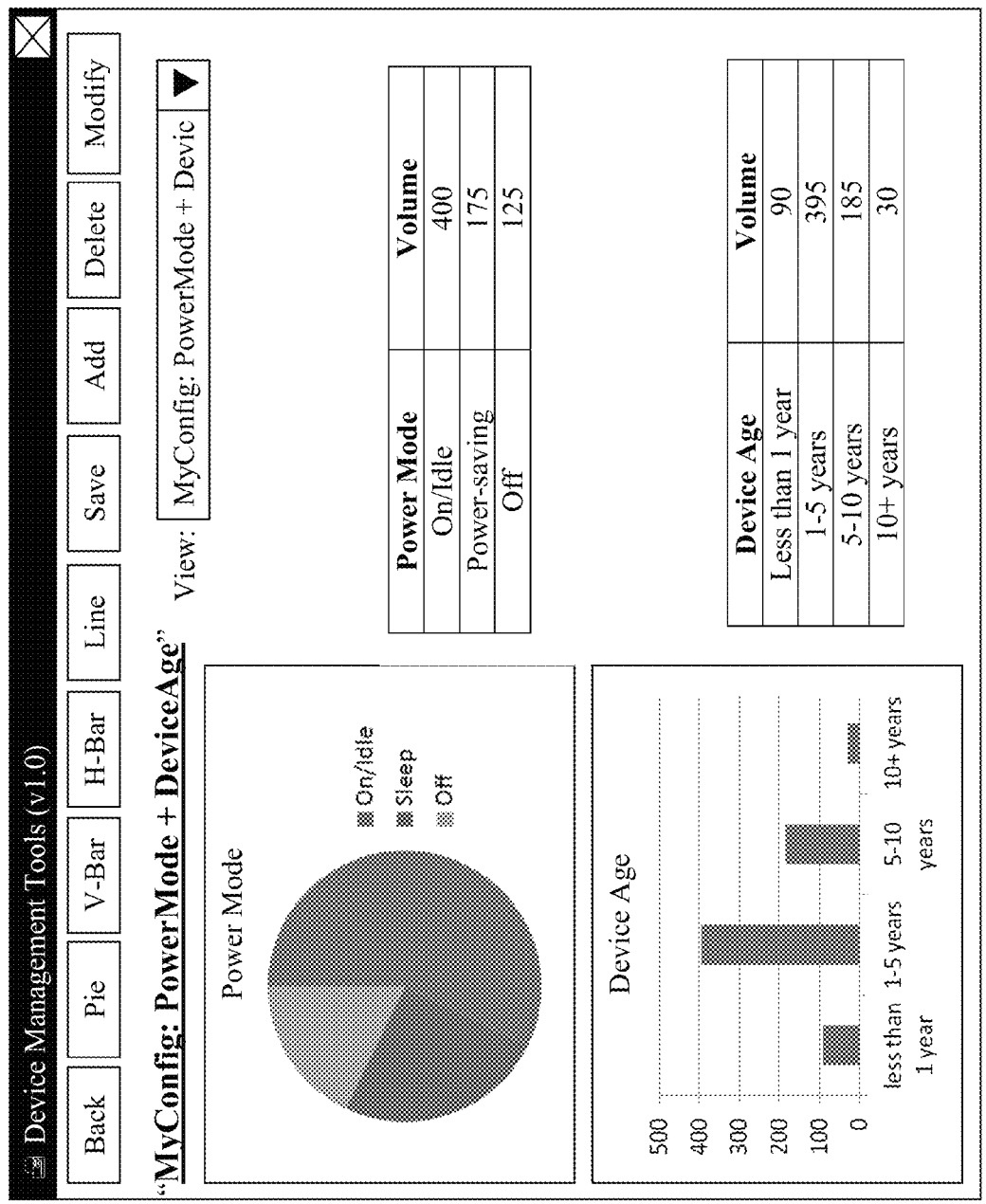

When the user clicks on the button "Add to Configuration", the selected graphical widget is added to the existing configuration (i.e. previous screen). In a case that more than one graphical widget are displayed (e.g. if the user has selected the "manufacturer" subparameter, which would have caused the GUI to display the device age for each manufacturer), multiple graphical widgets can be selected and added to the current configuration as well. For example, FIG. 9C shows the configuration of the GUI once the user has clicked on the "Add to Configuration" button in FIG. 9B. As shown in FIG. 9C, the configuration previously included only the "power mode" graph, and now the configuration also includes the newly added "device age" graph. The user can save the configuration for future use by clicking on the "save" button at the top of the screen, or add additional widgets by clicking on the "add" button. Further, the user can delete any selected widgets by clicking on the "delete" button, and modify the configuration by clicking on the "modify" button. For example, here, the user has renamed the configuration as "MyConfig: PowerMode+DeviceAge", as shown in FIG. 9C. The drop-down menu "view" allows the user to easily access and switch between numerous GUI configurations.

The widgets can be customized in countless other ways and are not limited to the examples discussed herein. For example, the user can add a graph illustrating the firmware versions of a particular device model in the European offices or a graph illustrating the manufacturer breakdown of the devices in the IT department of each office location. Thus, the user can customize the data displayed in the GUI such that the exact information that the user wishes to analyze is presented to the user in a manageable and clear format.

Figure 9D:
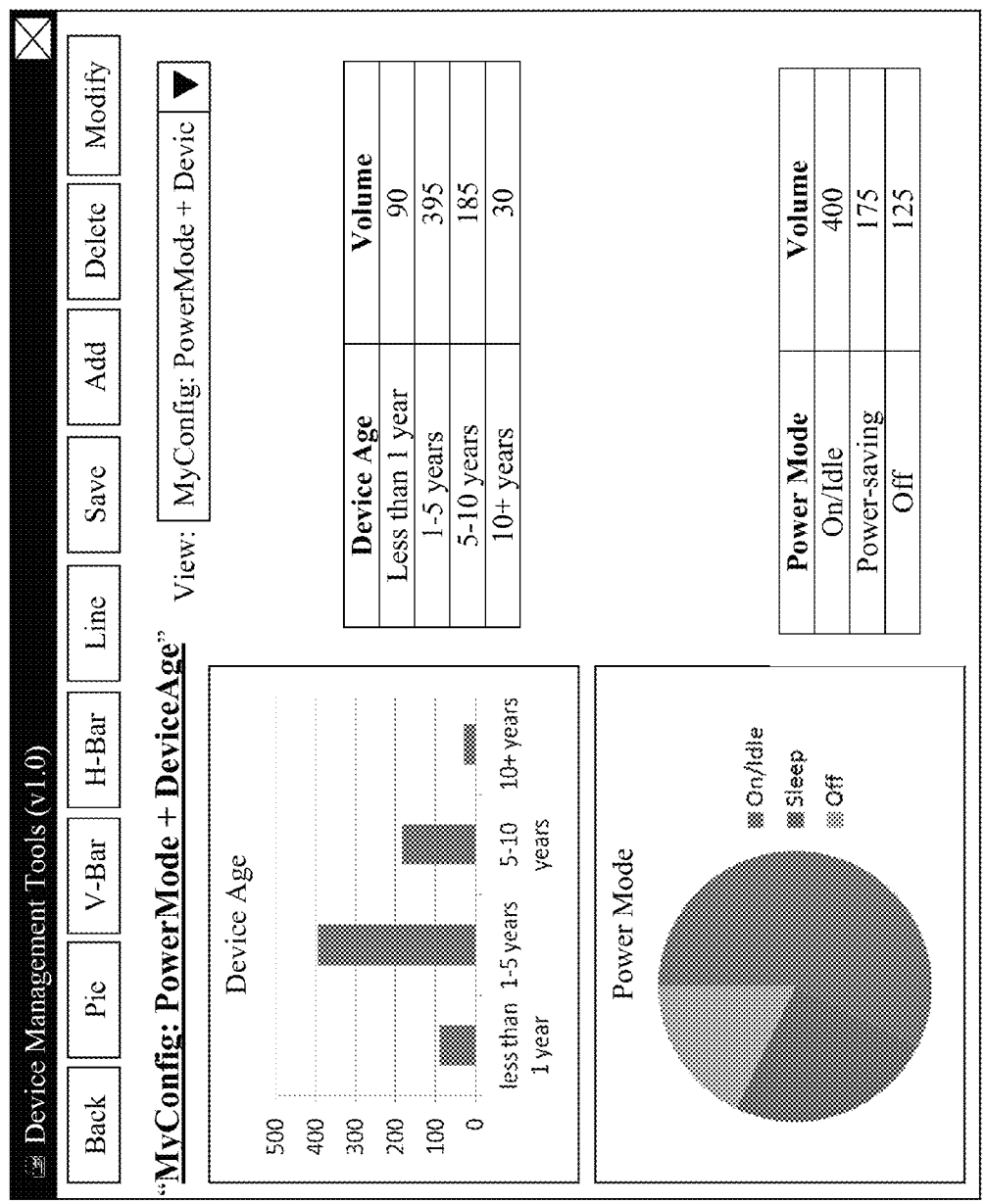

FIG. 9D shows another screenshot of the configuration of the GUI in which the graphical widgets of FIG. 9C have been rearranged by the user such that the order in which the graphical widgets are displayed is switched. For example, the user may move around the various elements of the GUI (e.g. the graphs labeled "device age" and "power mode" in FIG. 9D) by clicking and dragging the widget that the user wishes to move and dropping the widget at a new location. In the example of FIG. 2, upon receiving a user request to move the location of the widget display part of the GUI to a new location, the slice-and-dice data extraction unit 201*b* may cause the widget display part to be displayed in the new location specified by the user. The widgets may automatically be locked to predetermined positions, or the user may be allowed to freely position the widgets as he or she wishes in the GUI.

Figure 9E:
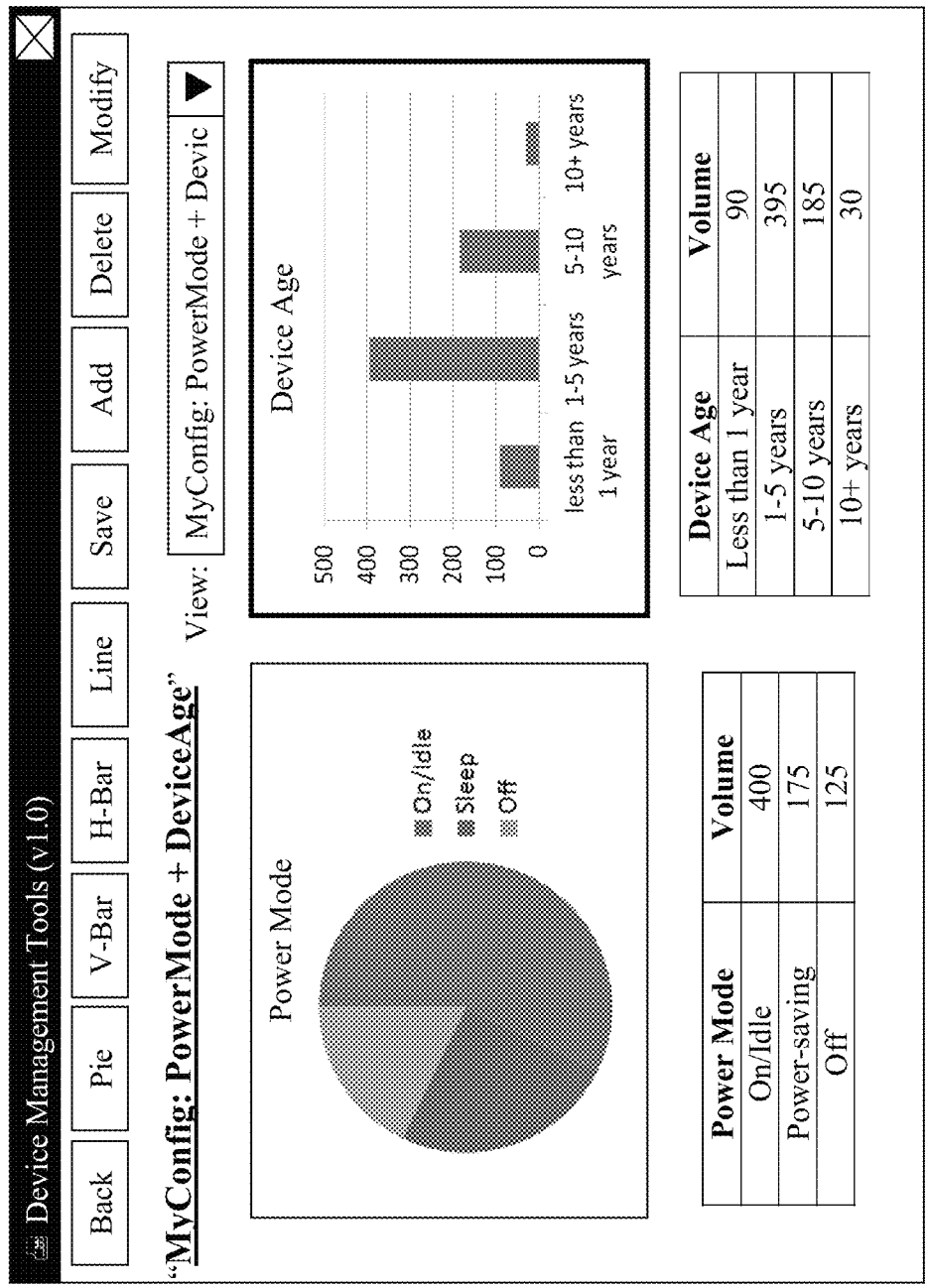
Figure 9F:
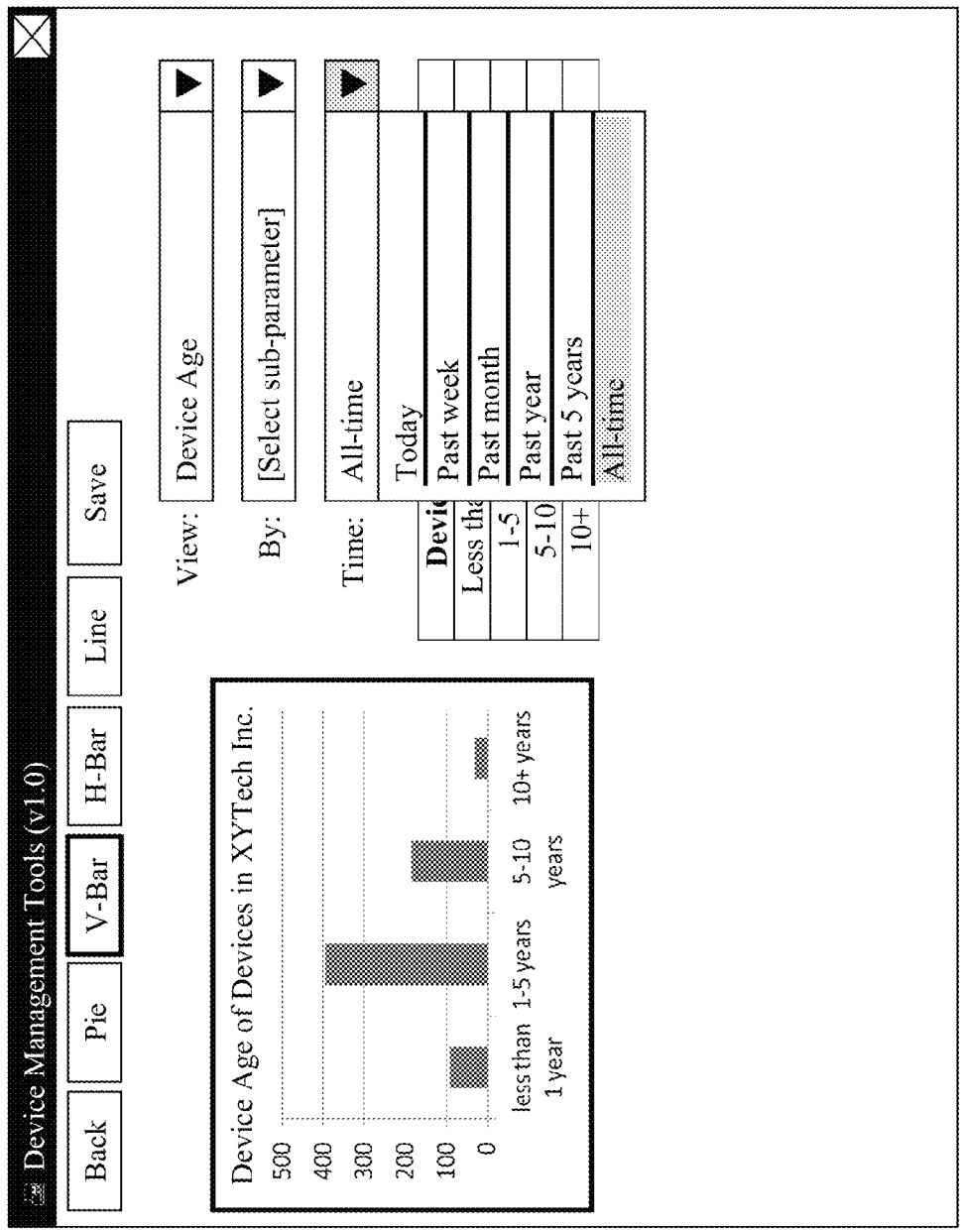

Another exemplary configuration of the GUI is shown in FIG. 9E. As shown in FIG. 9E, the graph labeled "device age" is selected (indicated by the bolded border). If the "modify" button is activated while the graph is selected, a modify screen is displayed to the user, which is illustrated in FIG. 9F. As shown in FIG. 9F, the name of the graph can be changed ("Device Age of Devices in XYTech, Inc."), and other parameters, sub-parameters, and other variables (e.g. "time") can be modified as well. The graphical widget is updated to reflect any changes requested by the user, and upon activating the "save" button, the previously displayed widget (e.g. "device age" graph in FIG. 9E) is replaced by the updated widget.

Figure 10A:
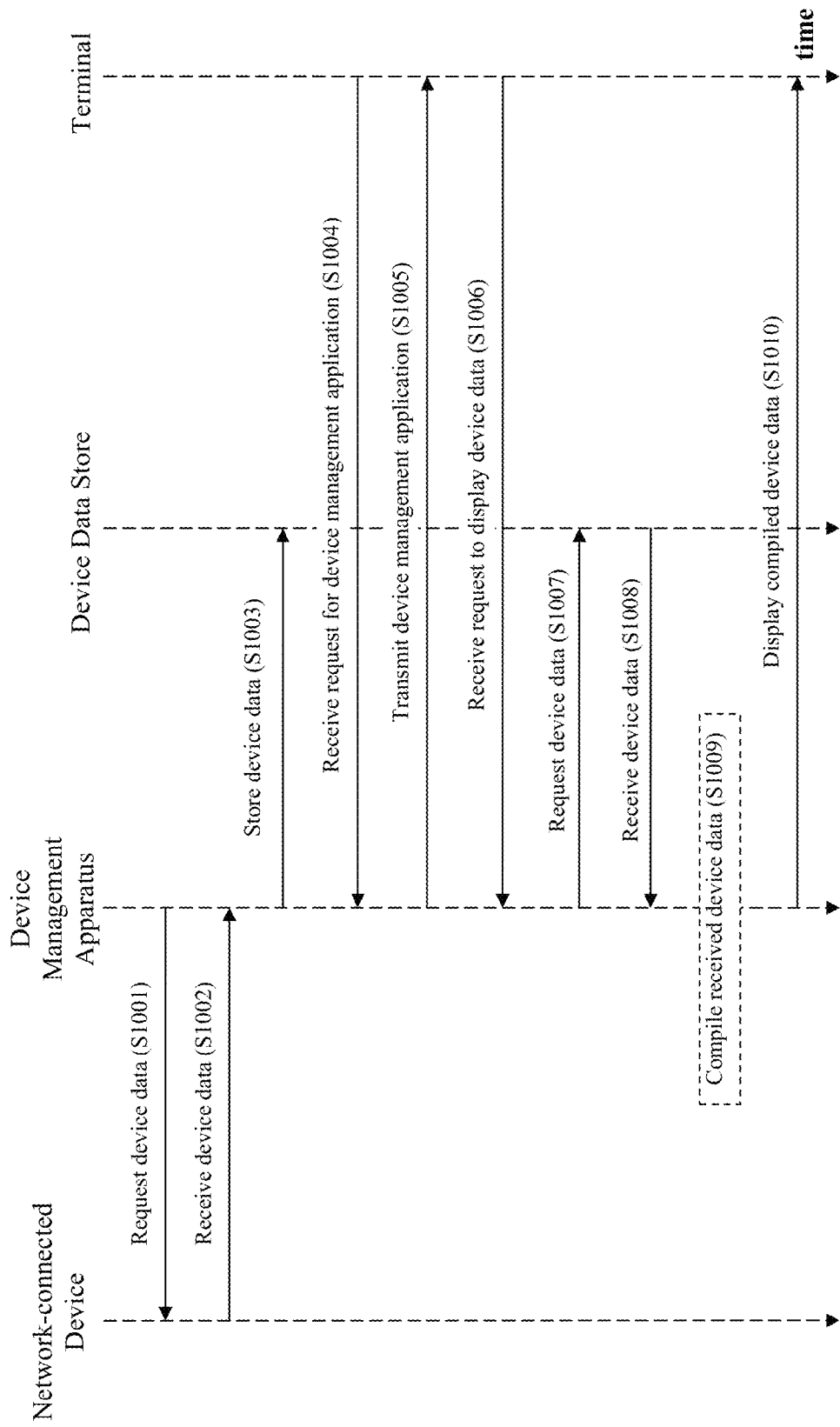
FIG. 10A shows a work flow of a method performed by a device management apparatus, such as illustrated in FIG. 2, according to an exemplary embodiment.

Turning now to FIG. 10A, there is shown a work flow in a method performed by a device management apparatus, such as illustrated in FIG. 2, according to an exemplary embodiment.

The device management apparatus requests device data from a plurality of network-connected devices in a network environment (step S1001) and in return, receives the requested device data (step S1002). Alternatively, as described above, the network-connected devices may automatically transmit device data to the device management apparatus at regular intervals. The device management apparatus then stores the received device data in a device data store for storing the device data of the plurality of network-connected devices. When the device management apparatus receives a request for a device management application from a user via a terminal device (step S1004), the device management apparatus transmits the requested device management application to the terminal device to be executed by the terminal device (step S1005).

As discussed above, the device management application may also be resident in a storage unit of the terminal device, in which case the device management application is simply executed by the processing unit of the terminal device and displayed on a graphical display unit of the terminal device instead of steps S1004 and S1005.

When the device management apparatus receives a request to display a set of device data from the user (step S1006), the device management apparatus retrieves the required device data from the device data store (steps 1007 and 1008) and compiles the device data in the format requested by the user (step S1009), and then displays the compiled device data to the user via the terminal device (step S1010).

Figure 10B:
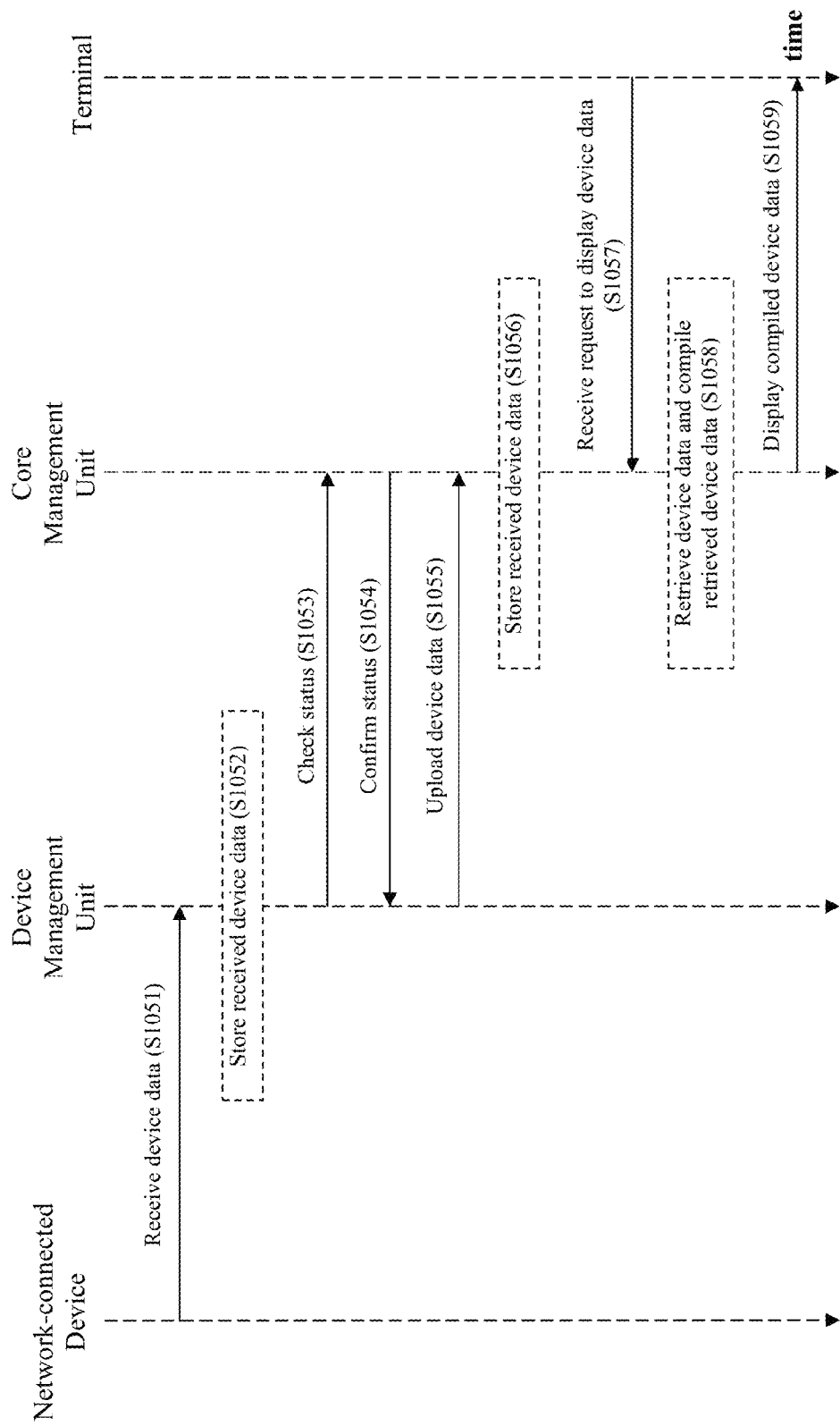
FIG. 10B shows a work flow in a device management system, according to an exemplary embodiment.

Turning now to FIG. 10B, there is shown a work flow in a device management system similar to the system 400 illustrated in FIG. 4, according to an exemplary embodiment.

The device data of the network-connected device is automatically uploaded to the device management unit (step S1051), and the uploaded device data is stored by the device management unit in, for example, an internal storage, a storage directly connected thereto, or a storage connected via a network (step S1052). The status of the core management unit is checked (step S1053), and once the core management unit confirms its availability (step S1054), the device data received by the device management unit is uploaded to the core management unit (step S1055), and the uploaded device data is stored by the core management unit in, for example, an internal storage, a storage directly connected thereto, or a storage connected via a network (step S1056).

When the core management unit receives from the terminal device a request to display device data (step S1057), the core management unit retrieves the stored device data, compiles the device data in the format requested by the user at the terminal device (step S1058), and displays the compiled device data to the user via the terminal.

Figure 11:
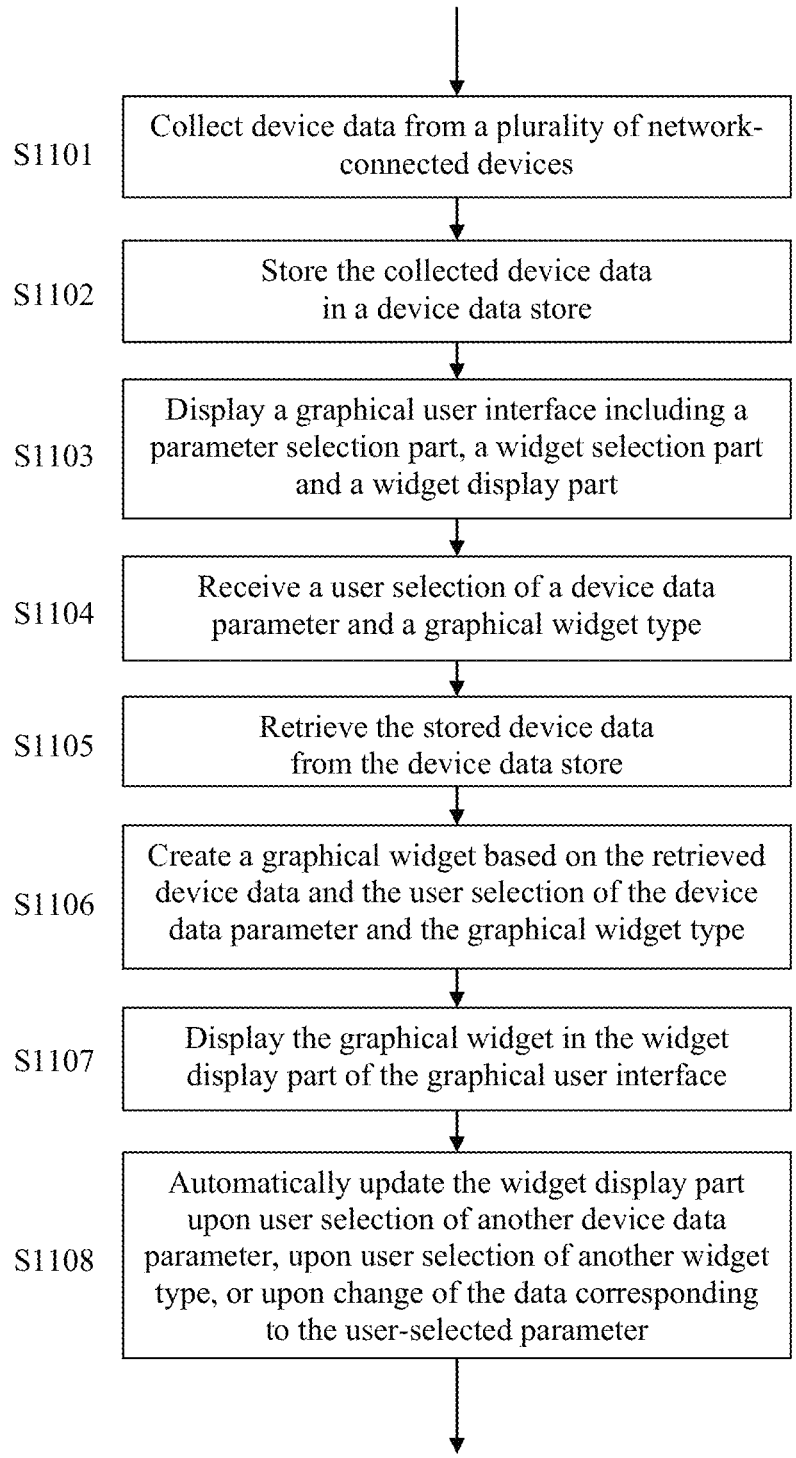
FIG. 11 shows a flowchart of a method performed by a device management apparatus, such as illustrated in FIG. 2, according to an exemplary embodiment.

FIG. 11 illustrates a method of managing the device data of a plurality of network-connected devices, in another exemplary embodiment. Such method is performed by a device management apparatus, such as illustrated in FIG. 2.

In this example, device data is collected from a plurality of network-connected devices (step S1101) and stored in a device data store (step S1102) in a manner similar to that described in the example of FIG. 10A. Then, a graphical user interface (GUI) including a parameter selection part, a widget selection part and a widget display part is displayed to the user (step S1103). Once the user selects a device data parameter and a graphical widget type (step S1104), the device data stored in the device data store is retrieved (step S1105) and a graphical widget is created based on the retrieved device data and the user-selected device data parameter and graphical widget type (step S1106). The created graphical widget is displayed in the widget display part of the GUI (step S1107).

If the user selects another device data parameter or another widget type, or if the device data corresponding to the user-selected parameter changes, the widget display part is automatically updated (e.g. by the slice-and-dice data extraction unit shown in FIG. 2) to reflect the change in the user selection and/or the device data (step S1108). For example, if the widget display part provided to the user currently displays a graph illustrating the different device statuses of the plurality of network-connected devices, and the device statuses of some of those network-connected devices change, the displayed graph is automatically updated to reflect such change. Similarly, if the user selects a device data parameter other than "device status", the widget display part of the GUI is automatically updated to display a new graph corresponding to the device data parameters newly selected by the user.

Turning now to FIG. 11, there is shown a flowchart of a method of allowing the user of the device management apparatus, such as illustrated in FIG. 2, to move around the elements of the GUI, according to an exemplary embodiment.

When a user command to move the location of the widget display part of the GUI to a new location is received (step S1101), the widget display part is caused (e.g. by the slice-and-dice data extraction unit shown in FIG. 2) to be displayed in the new location specified by the user. Similarly, the user is allowed to move around various widgets displayed in the widget display part of the GUI such that each widget is displayed in a location of the user's choice.

Figure 12:
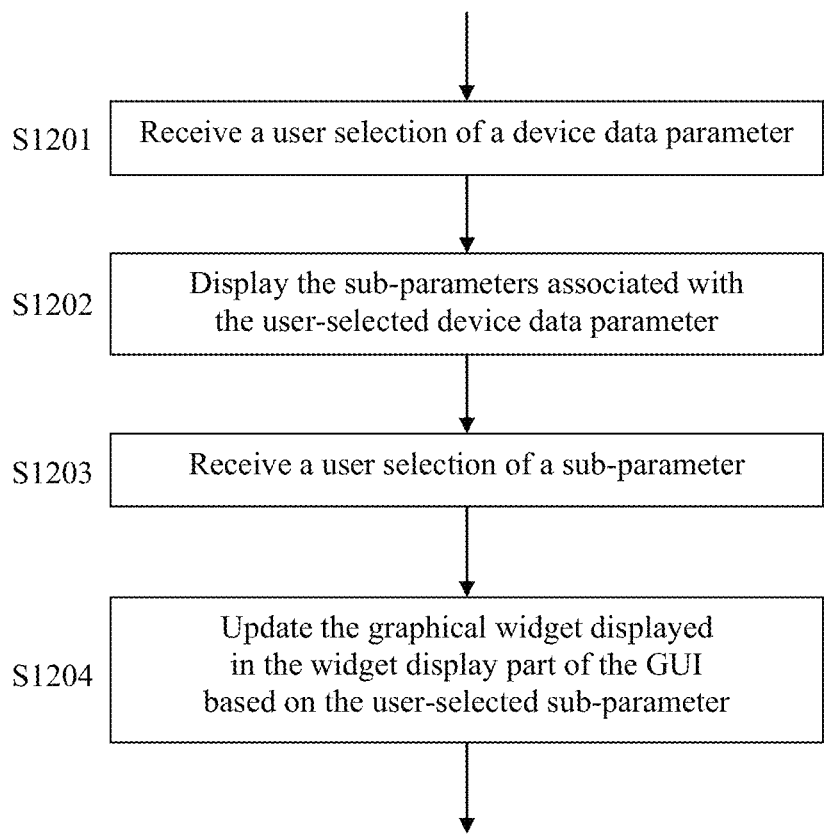
FIG. 12 shows a flowchart of a method performed by a device management apparatus, such as illustrated in FIG. 2, according to an exemplary embodiment.

Turning now to FIG. 12, there is shown a flowchart of a method of updating the GUI upon user selection of a subparameter associated with the user-selected device data parameter, according to an exemplary embodiment.

When the user selects a device data parameter indicating the device data that the user wishes to analyze (e.g. "device age") (step S1201), the widget display part of the GUI displays a graph illustrating the device data corresponding to the device data parameter selected by the user. In addition, the subparameters associated with the user-selected device data parameter are displayed (step S1202). For example, such subparameters may be "manufacturer", "location", etc. When the user selects a subparameter (e.g. "manufacturer") from the list of subparameters (step S1203), the graphical widget displayed in the widget display part of the GUI is updated to reflect the user selection of the subparameter. For example, when the user selects the device data parameter "device age", a graph shown in FIG. 9A may be displayed. If the user then selects a subparameter "manufacturer", then the graph of FIG. 9A may be updated to illustrate an average device age for each manufacturer.

Alternatively, additional graphical widgets may be displayed in the widget display part along with the graphical widget corresponding to the device data parameter initially selected by the user. For example, in another exemplary embodiment, upon the user selection of the subparameter "manufacturer", an additional graph may be displayed in the widget display part of the GUI for each manufacturer, each additional graph illustrating the device age of the network-connected devices manufactured by a particular manufacturer.

Figure 13:
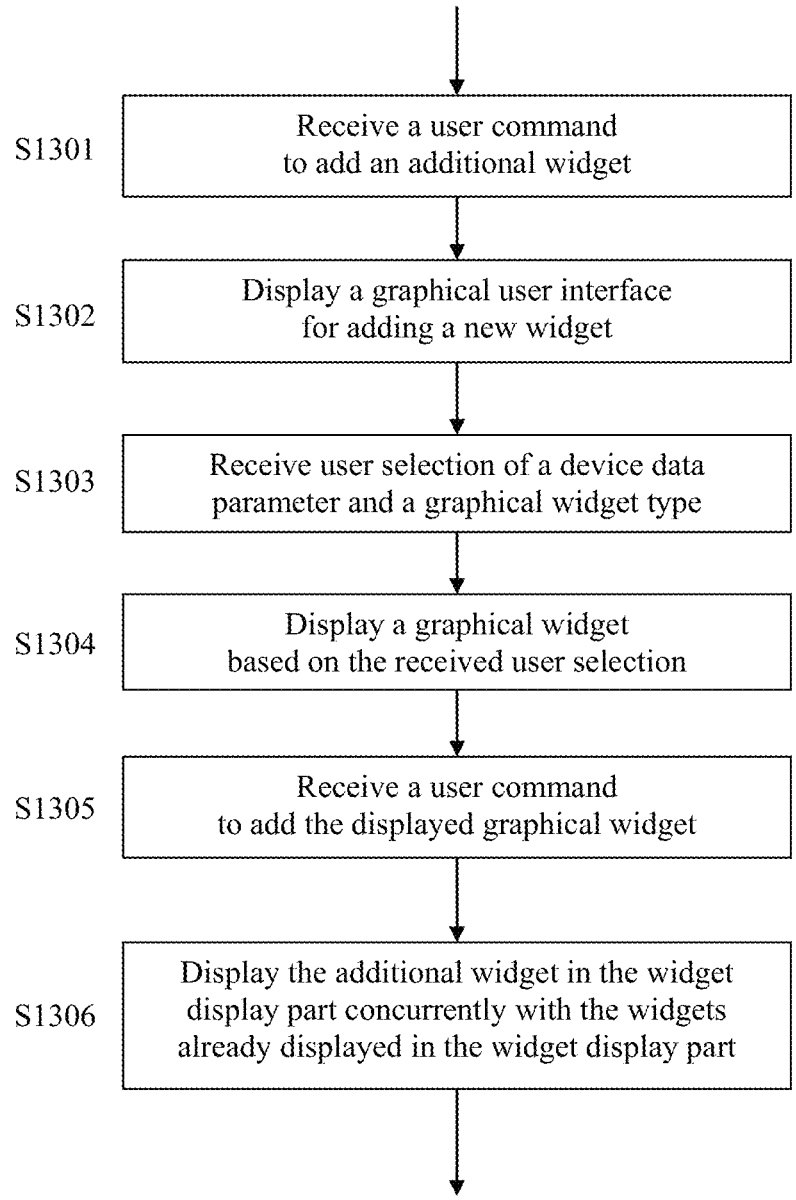
FIG. 13 shows a flowchart of a method performed by a device management apparatus, such as illustrated in FIG. 2, according to an exemplary embodiment.

Turning now to FIG. 13, there is shown a flowchart of a method of adding an additional widget to the widget display part of the GUI, according to an exemplary embodiment.

When a user command to add an additional widget to the widget display part of the GUI is received (step S1301), a new graphical user interface (GUI) is displayed (e.g. by a slice-and-dice data extraction unit such as shown in FIG. 2) to the user (step S1302). When the user selects a device data parameter and a graphical widget type via the new GUI displayed to the user (step S1303), a graphical widget based on the received user selection of the device data parameter and the graphical widget type is displayed (step S1304). If the user indicates that he or she wishes to add the displayed graphical widget (e.g. by selecting the graphical widget and clicking on the "Add to Configuration" button shown in FIG. 9A) (step S1305), the selected graphical widget is displayed in the widget display part of the GUI concurrently with the widgets already displayed in the widget display part (step S1306), as discussed above with reference to and as illustrated in FIG. 9B.

Figure 14A:
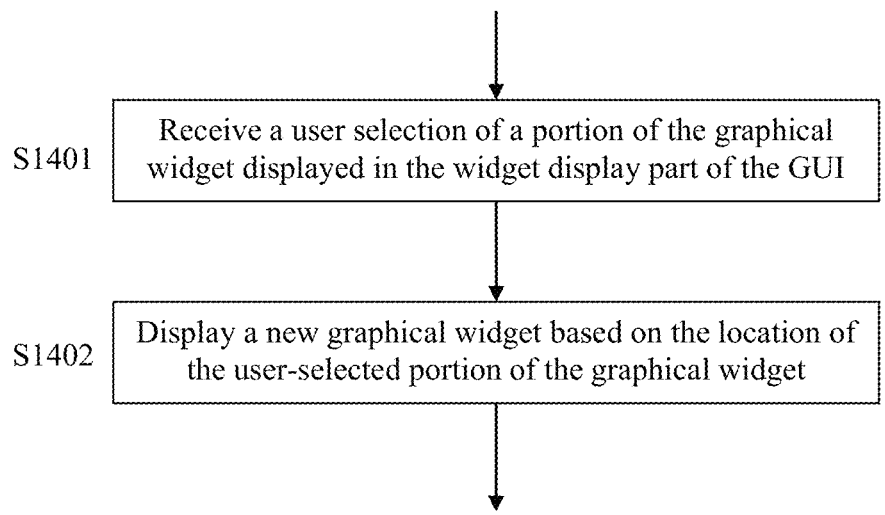
FIG. 14A shows a flowchart of a method performed by a device management apparatus, such as illustrated in FIG. 2, according to an exemplary embodiment.

Turning now to FIG. 14A, there is shown a flowchart of a method of updating a graphical widget displayed in the widget display part of the GUI, according to an exemplary embodiment.

Figure 14B:
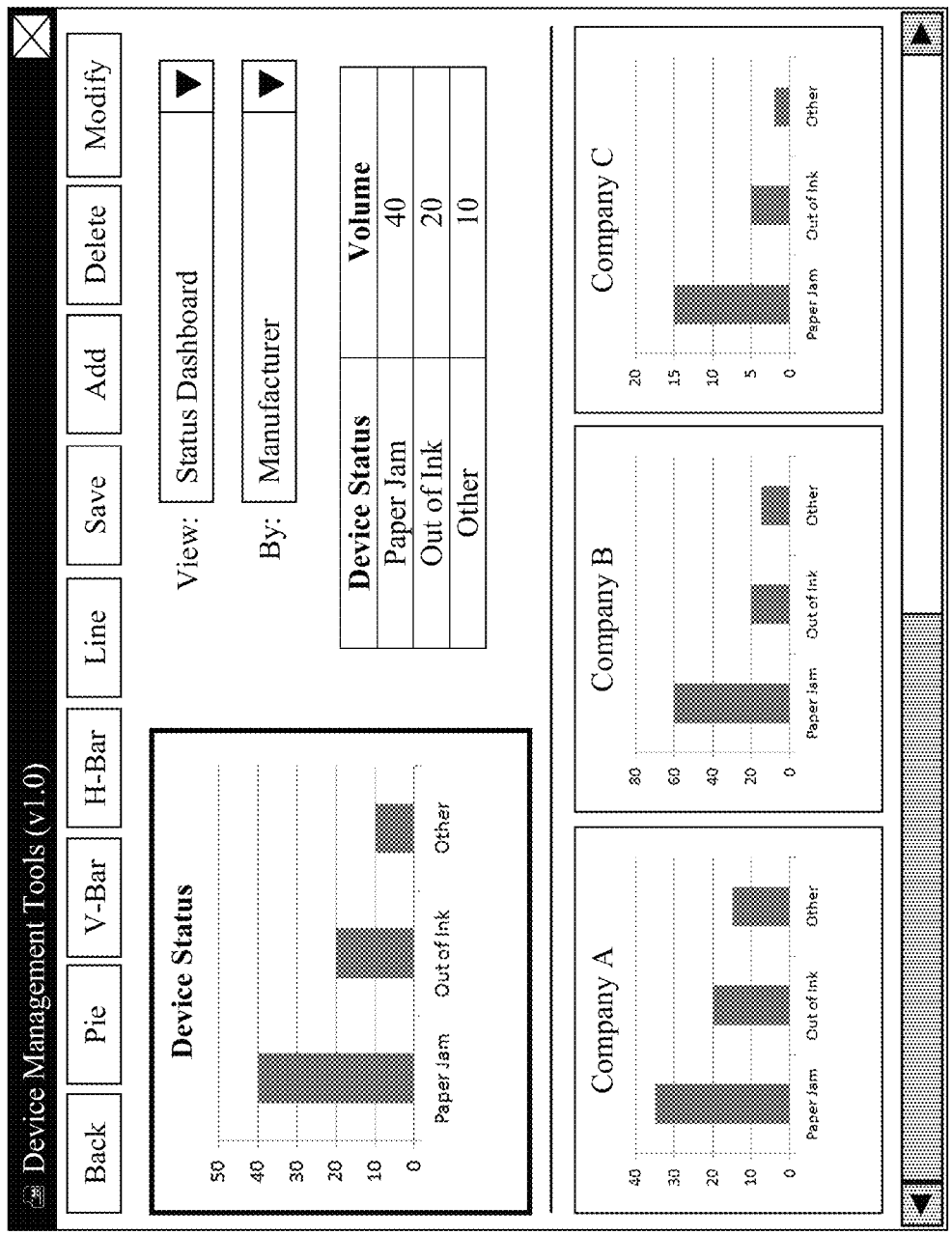
FIG. 14B shows a sample arrangement of graphs displayed to the user, according to an exemplary embodiment.

In the example shown in FIG. 14A, when the user selects (i.e. clicks on) a particular portion of the graphical widget displayed in the widget display portion of the GUI (step S1401), a new graphical widget (or a new set of graphical widgets) based on the location of the user-selected portion of the graphical widget (step S1402). For example, in the GUI displayed in FIG. 8C, if the user clicks on the "no" portion (i.e. representative of unavailable devices) of the pie graph illustrated at the top left corner of the GUI, device data corresponding to those network-connected devices that are currently unavailable may further be illustrated in a new graph such as shown in FIG. 14B. In FIG. 14B, a further breakdown of the network-connected devices that are currently down is provided in the form of a vertical bar graph. At the bottom of the screen, a similar breakdown is provided for each manufacturer, upon user selection of the subparameter "manufacturer".

As discussed above, even though the list view of FIG. 1 allows an IT administrator to see the device information such as name, address, serial number, status, etc. for each device in the network environment, if the IT administrator, for example, wishes to figure out how many new ink cartridges to order for a particular model manufactured by Company A (presumably, the network environment has more than one of such particular model), the IT administrator has to go through the trouble of finding out how many such devices are in the network environment, and check the ink state of each device.

In contrast, in the exemplary embodiment described in connection with FIGS. 14A and 14B, the IT administrator can simply load from the pull-down menu a previously saved configuration including a graph illustrating the ink state of the devices manufactured by each manufacturer, and click on a portion of the graph corresponding to "low" (or "very low" or "empty" depending on the graph settings) to further receive a breakdown of different device models of the particular manufacturer having a low ink state. From there, the IT administrator can easily determine the number of new ink cartridges he or she needs to order for each particular device model of such manufacturer.

Thus, in the aforementioned aspects of the present disclosure, even when the plurality of network-connected devices produce an overwhelming amount of information due to the sheer number of the network-connected devices, such information can be broken down and presented to the user in a manner that is easy to understand and customized according to the preference of the user.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A device management apparatus to manage a plurality of network-connected devices, said device management apparatus comprising a non-transitory computer readable medium embodying one or more programs of executable instructions to configure the device management apparatus to include:
   a device management unit that maintains and retrieves data in a device data store storing device data for the plurality of network-connected devices; and
   a slice-and-dice data extraction unit that displays a graphical user interface (GUI) including
      a parameter selection part for user selection of a device data parameter of interest and user selection of a sub-parameter, and
      a widget selection part for user selection of at least one graphical widget type from a plurality of candidate widget types, and
      a widget display part that displays a graphical widget of interest of the user-selected widget type and rendered to reflect data corresponding to the user-selected device data parameter of interest for the plurality of network-connected devices, retrieved by the device management unit from the device data store,
   wherein when the user-selected device sub-parameter is location, the widget display part displays additional graphical widgets breaking down the retrieved data of the user-selected parameter to respective regions, and in response to user selection of a particular graphical widget amongst the additional graphical widgets, the widget display part replaces the graphical widget of interest with the particular graphical widget, and displays, alongside the particular graphical widget, replacement graphical widgets replacing the additional graphical widgets, respectively, and further breaking down the data corresponding to the particular graphical widget to respective sub-regions of the region corresponding to the user-selected particular graphical widget.

2. The device management apparatus of claim 1, wherein when the user-selected parameter of interest includes subparameters,
  (a) the parameter selection part further displays, for user selection, the subparameters of the user-selected parameter, upon user selection of the parameter of interest, and
  (b) the graphical widget displayed in the widget display part is rendered to reflect data corresponding to the user-selected parameter of interest and user-selected subparameter for the plurality of network-connected devices.

3. The device management apparatus of claim 1, wherein the graphical user interface further includes a widget customization part for the user to specify a customized widget by selecting a widget type, specifying a widget name, specifying source data parameter, and saving the customized widget.

4. The device management apparatus of claim 3, wherein the widget customization part further permits the user to specify a specific time period of interest for the data to be rendered in the customized widget.

5. The device management apparatus of claim 1, wherein the widget selection part is further configured to permit the user to add an additional widget to the widget display part, and the graphical user interface is configured to display two or more user-selected widgets concurrently in the widget display part.

6. The device management apparatus of claim 1, further comprising a GUI selection unit for user selection of a specific GUI from amongst a plurality of GUI candidates, wherein the GUI candidates include a green GUI that shows power mode and power usage.

7. The device management apparatus of claim 6, wherein the GUI candidates further include a device GUI that shows device counts, device distribution according to device manufacturer, device distribution according to device type, device distribution according to connection type, and device distribution according to device capability.

8. The device management apparatus of claim 6, wherein the GUI candidates further include a status GUI that shows device availability and device errors.

9. The device management apparatus of claim 6, wherein the GUI candidates further include a usage GUI that shows device function usage.

10. The device management apparatus of claim 6, further comprising a GUI customization part for the user to customize the graphical user interface by selecting one of the plurality of GUI candidates, specifying a GUI name, specifying device groups, specifying a specific time period unit, and saving the customized GUI.

11. A system for managing a plurality of network-connected devices, said system comprising:
  a device data store storing device data for the plurality of network-connected devices;
  a terminal apparatus including a processing unit and a graphical display unit; and
  a slice-and-dice data extraction unit that causes a graphical user interface (GUI) to be displayed on the graphical display unit of the terminal apparatus, the GUI including
    a parameter selection part for user selection of a device data parameter of interest and user selection of a sub-parameter, and
    a widget selection part for user selection of at least one graphical widget type from a plurality of candidate widget types, and
    a widget display part that displays a graphical widget of interest of the user-selected widget type and rendered to reflect data corresponding to the user-selected device data parameter of interest for the plurality of network-connected devices, retrieved from the device data store,
  wherein when the user-selected device sub-parameter is location, the widget display part displays additional graphical widgets breaking down the retrieved data of the user-selected parameter to respective regions, and in response to user selection of a particular graphical widget amongst the additional graphical widgets, the widget display part replaces the graphical widget of interest with the particular graphical widget, and displays, alongside the particular graphical widget, replacement graphical widgets replacing the additional graphical widgets, respectively, and further breaking down the data corresponding to the particular graphical widget to respective sub-regions of the region corresponding to the user-selected particular graphical widget.

12. The system of claim 11, further comprising:
  one or more device management units that collect device data from the plurality of network-connected devices and cause the collected device data to be stored in the device data store.

13. The system of claim 12, wherein one of the device management units, in response to a request from the terminal apparatus, transmits a device management application including the slice-and-dice data extraction unit to the terminal apparatus, and when the device management application including the slice-and-dice data extraction unit is executed by the processing unit of the terminal apparatus, the graphical user interface (GUI) is displayed on the graphical display unit of the terminal apparatus.

14. The system of claim 12, wherein the terminal apparatus further includes a storage unit that stores a device management application including the slice-and-dice data extraction unit to the terminal apparatus, and when the device management application including the slice-and-dice data extraction unit is executed by the processing unit of the terminal apparatus, the graphical user interface (GUI) is displayed on the graphical display unit of the terminal apparatus, and the slice-and-dice data extraction unit communicates with the device management units, to obtain the device data from the device data store.

15. A method of managing a plurality of network-connected devices in a network environment, said method comprising:
  collecting device data from the plurality of network-connected devices in the network environment;
  storing the collected device data in a device data store in the network environment;
  displaying a graphical user interface (GUI) on a terminal device of a user;
  receiving a user selection, via the graphical user interface, of a device data parameter of interest, a sub-parameter and a graphical widget type;
  retrieving from the device data store data corresponding to the user-selected device data parameter of interest for the plurality of network-connected devices and displaying in a widget display part of the graphical user interface, (i) a graphical widget of interest of the user-selected graphical widget type based on the user selection of the device data parameter of interest and (ii) additional graphical widgets based on the user selection of the sub-parameter, wherein when the user-selected device sub-parameter is location, the additional graphical widgets breaks down the retrieved data of the user-selected parameter to respective regions, and in response to user selection of a particular graphical widget amongst the additional graphical widgets, the widget display part replaces the graphical widget of interest with the particular graphical widget, and displays, alongside the particular graphical widget, replacement graphical widgets replacing the additional graphical widgets, respectively, and breaking down the data corresponding to the particular graphical widget to respective sub-regions of the region corresponding to the user-selected particular graphical widget.

16. The method of claim 15, further comprising:

receiving a user command to move a location of the widget display part to a new location in the graphical user interface; and displaying the widget display part in the new location in the graphical user interface.

17. The method of claim 15, further comprising:

displaying, when the user-selected device data parameter includes subparameters, for user selection, the subparameters of the user-selected device data parameter, upon the user selection of the device data parameter; and updating the graphical widget displayed in the widget display part to reflect device data corresponding to the user-selected parameter and the user-selected subparameter for the plurality of network-connected devices.

18. The method of claim 15, further comprising:

receiving a user selection of an additional widget to be added to the widget display part; and displaying the additional widget in the widget display part concurrently with one or more other widgets already displayed in the widget display part.

19. The method of claim 15, further comprising:

displaying subparameters of the user-selected device data parameter, for user selection, to permit the user to drill-down the user-selected device data parameter to a next level of display; and providing a GUI part at said next level of display to permit the user to drill-up to a previous level of display.

* * * * *